United States Patent
Soni et al.

(10) Patent No.: US 8,631,483 B2
(45) Date of Patent: Jan. 14, 2014

(54) PACKET PROCESSORS AND PACKET FILTER PROCESSES, CIRCUITS, DEVICES, AND SYSTEMS

(75) Inventors: Maneesh Soni, Dallas, TX (US); Amritpal S. Mundra, Dallas, TX (US); Thomas H. McKinney, Dallas, TX (US); Jagdish Doma, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 1925 days.

(21) Appl. No.: 11/421,121

(22) Filed: May 31, 2006

(65) Prior Publication Data

US 2007/0110053 A1    May 17, 2007

Related U.S. Application Data

(60) Provisional application No. 60/690,266, filed on Jun. 14, 2005.

(51) Int. Cl.
*G06F 9/00* (2006.01)

(52) U.S. Cl.
USPC ............................ 726/13; 709/223; 370/389

(58) Field of Classification Search
USPC .................................................. 726/13, 1–3
See application file for complete search history.

(56) References Cited

U.S. PATENT DOCUMENTS

| | | | |
|---|---|---|---|
| 7,389,537 B1 * | 6/2008 | Callon et al. | 726/22 |
| 7,394,809 B2 | 7/2008 | Kumar et al. | |
| 2003/0187914 A1 * | 10/2003 | Kaniyar et al. | 709/201 |
| 2004/0073773 A1 * | 4/2004 | Demjanenko | 712/7 |
| 2004/0190526 A1 * | 9/2004 | Kumar et al. | 370/395.21 |
| 2004/0202184 A1 * | 10/2004 | Yazaki et al. | 370/395.31 |
| 2004/0210701 A1 * | 10/2004 | Papa et al. | 710/306 |

* cited by examiner

*Primary Examiner* — Fikremariam A Yalew
(74) *Attorney, Agent, or Firm* — James F. Hollander; Wade J. Brady, III; Frederick J. Telecky, Jr.

(57) ABSTRACT

A packet filter (2500) for incoming communications packets includes extractor circuitry (2510) operable to extract data from a packet, and packet processor circuitry (2520) operable to concurrently mask (3010) the packet data from the extractor circuitry (2510), perform an arithmetic/logic operation (3020) on the packet to supply a packet drop signal (DROP), and perform a conditional limit operation and a conditional jump operation (3030).

14 Claims, 10 Drawing Sheets

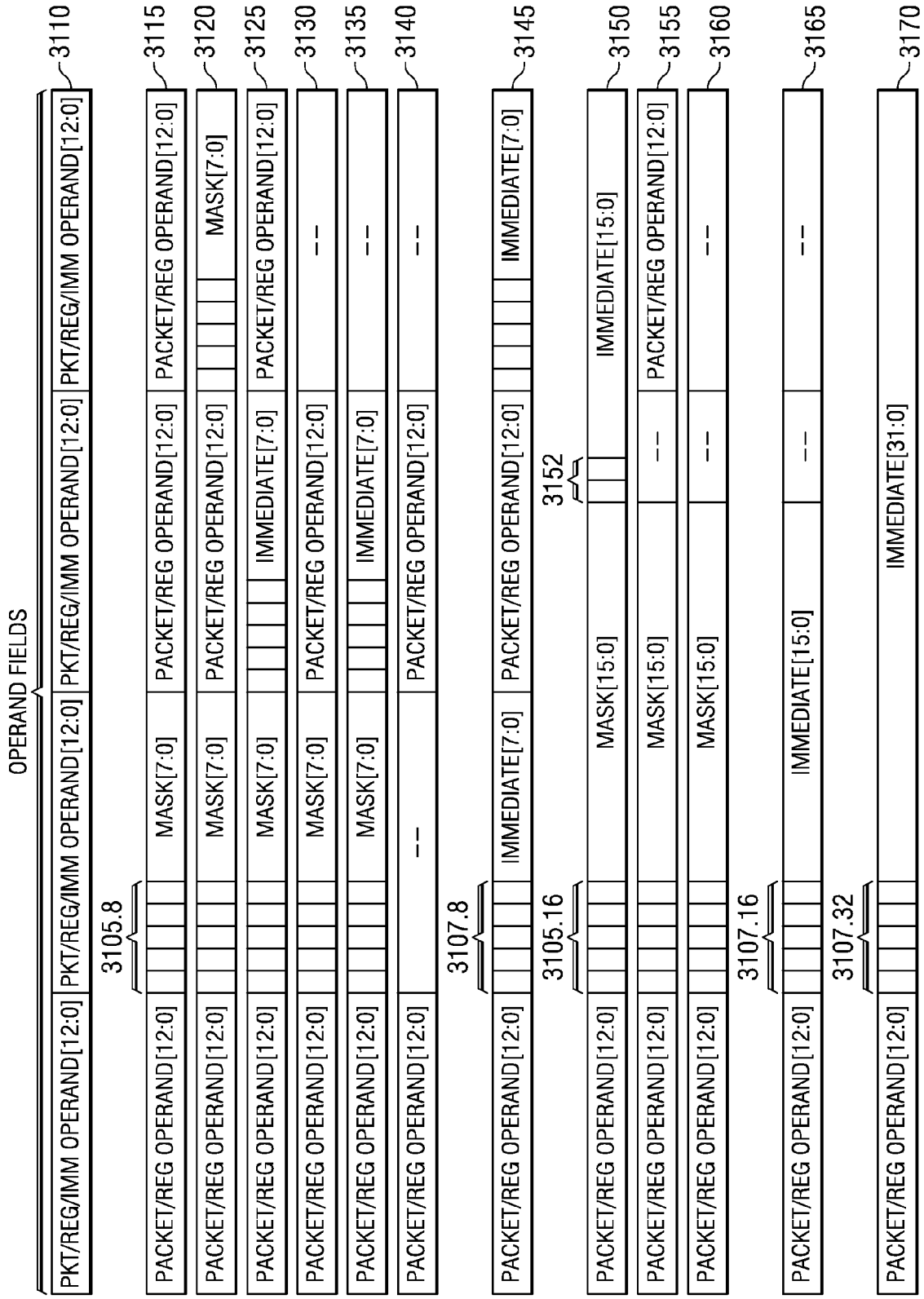

PACKET PROCESSORS AND PACKET FILTER PROCESSES, CIRCUITS, DEVICES, AND SYSTEMS

CROSS-REFERENCE TO RELATED APPLICATIONS

This patent application is related to provisional application U.S. Ser. No. 60/690,266, filed Jun. 14, 2005, entitled "Packet Processors And Packet Filter Processes, Circuits, Devices, and Systems" of Amritpal Mundra, Maneesh Soni, Jagdish Doma and Thomas McKinney, for which priority under 35 U.S.C. 119(e)(1) is hereby claimed, and is hereby also incorporated herein by reference.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved processes, circuits, devices, and systems for information and communication processing and protection against unauthorized communications, and processes of operating, protecting and making them. Without limitation, the background is further described in connection with communications processing and wireless communications.

Wireless communications, of many types, have gained increasing popularity in recent years. The mobile wireless (or "cellular") telephone has become ubiquitous around the world. Mobile telephony has recently begun to communicate video and digital data, in addition to voice. Wireless devices, for communicating computer data over a wide area network, using mobile wireless telephone channels and techniques are also available.

Wireless data communications in wireless local area networks (WLAN), such as that operating according to the well-known IEEE 802.11 standard, have become especially popular in a wide range of installations, ranging from home networks to commercial establishments. Short-range wireless data communication according to the "Bluetooth" technology permits computer peripherals to communicate with a personal computer or workstation within the same room.

Improved security of retail and other business commercial transactions in electronic commerce and the security of communications wherever personal and/or commercial privacy is desirable. Security is important in both wireline and wireless communications. Added features and security add further processing tasks to the communications system. These potentially mean added software and hardware in systems where cost and power dissipation are already important concerns.

Improved processors, such as RISC (Reduced Instruction Set Computing) processors and/or digital signal processing (DSP) chips and/or other integrated circuit devices are very useful in these systems and applications. Reducing the cost of manufacture, increasing the efficiency of executing more instructions per cycle, and protection from unauthorized communications without compromising performance are important goals in RISC processors, DSPs, integrated circuits generally and system-on-a-chip (SOC) design. These goals are important in wireline devices and in wireless handheld/mobile applications where small size is so important, to control the cost and the power consumed and deliver actual performance in the face of a mix of authorized and unauthorized traffic impinging on the application.

Voice over Internet Protocol (VoIP) systems are an example of one communications believed to hitherto have often been highly susceptible to various types of network intrusions such as Denial of Service (DoS) attacks.

A VoIP telecommunications device such as an IP (Internet Protocol) phone is a network device and is exposed to all types of network traffic. Like other network devices, an IP phone can be victimized by malformed frames or packet flood attacks, thereby leading to denial of service (DoS). Voice communications require consistent and reliable bandwidth that can be interrupted when DoS packets preempt or consume the available network bandwidth. This denial of service can not only have an adverse effect on voice quality of an ongoing call, but also render the phone unable to make or receive any further calls. A mechanism that can defend the IP phone from such events would be desirable and indeed can be expected to become increasingly necessary to ensure quality and reliability of voice services.

Among other problems, it would be highly desirable to solve problems of how to efficiently and economically resist denial of service and other attacks. These problems need to be solved with respect to instruction efficiency and operating frequency and low power dissipation in microprocessors, telecommunications apparatus and computer systems.

SUMMARY OF THE INVENTION

Generally, a form of the invention involves a packet processor for incoming communications packets including extractor circuitry operable to extract data from a packet, and processing circuitry operable to concurrently mask the packet data from the extractor circuitry, perform an arithmetic/logic operation on the packet to supply a packet drop signal, and perform a conditional limit operation and a conditional jump operation.

Generally, another form of the invention involves a packet filtering system including a bus for receiving communications packets having headers, a buffer coupled to said bus for holding at least part of a header of at least one of the communications packets, a storage space having a first field for a rate limit value and a rate limit counter associated with said first field, the storage space having a second field for a rate limit clock pre-scaling value, a packet filter having an input coupled to said bus, and an output coupled to control said buffer; the packet filter coupled to said storage space and operable to subject the header to a test affected by said rate limit value and said rate limit clock pre-scaling value and interactive with said rate limit counter.

Generally, a further form of the invention involves an integrated circuit for communications packets, including bus interface circuitry including a packet header-position determining circuit and a counter for counting bit-groups in a packet, a packet buffer coupled to said bus interface circuitry, and extraction logic coupled to said packet buffer, said header-position determining circuit, and said counter, the extraction logic having an offset input for an offset code, and the extraction logic operable as a function of a bit-group count from said counter, a header position from said header-position determining circuit, and an offset code from said offset input, for said extraction logic to produce an output representing at least one datum in the packet from said packet buffer.

Generally, another further form of the invention involves a method for packet data extraction including monitoring a bus for a packet and holding bit-groups from the packet in a packet buffer, determining a packet header-position of the packet, counting bit-groups in the packet to determine a bit-group count at a reference location in a packet buffer, and extracting at least one datum in the packet by accessing a position in said packet buffer as a function of 1) a bit-group count from said counter, 2) a header position determined from the packet, and 3) an offset code.

Generally, yet another form of the invention involves a packet filter circuit for filtering incoming communications packets including an extractor circuit operable to extract at least one particular datum from a said packet, and a programmable rule engine operable to subject the datum to a test and supply a signal to drop the packet if the packet fails the test.

Generally, a yet further form of the invention involves a processor instruction having an operand field, an arithmetic/logic field, and a field selectively operable as a rate limit field, a jump field, and a save field.

Generally, an additional form of the invention involves a process for a host to control a packet filter having an event logger and packet filter registers, the host having a memory, the process including storing logging thresholds in at least one of the packet filter registers, and loading at least one packet filter register to associate drop codes indicative of different tests on packets, with the logging thresholds.

Generally, another additional form of the invention involves a process of manufacturing a mobile phone with a flash memory coupled to a processor and for packet filtering, the process including programming the flash memory with code representing a method of operation by the processor to configure the packet filtering based on a packet rate limit value.

Generally, an additional further form of the invention involves a mobile phone including a wireless modem for receiving packets, a storage space for holding information from received packets, a processor coupled to said storage space, said processor operable to produce a voice communication from the information from received packets held in said storage space, and packet processing circuitry fed by said wireless modem and operable to drop packets that fail predetermined tests and to couple information to said storage space from received packets that do not fail the predetermined tests.

Other forms of the invention involve communications devices, systems, circuits, integrated circuits, processors, instructions, processes and methods of operation, processes of manufacture, and articles of manufacture, as disclosed and claimed.

BRIEF DESCRIPTION OF THE DRAWINGS

FIG. 9 is a diagram of thirteen different combinations of inventive sub-formats for use in different inventive instructions for the inventive packet processor of FIGS. 7 and 6;

Corresponding numerals ordinarily identify corresponding parts in the various Figures of the drawing except where the context indicates otherwise.

DETAILED DESCRIPTION OF EMBODIMENTS

Figure 1:
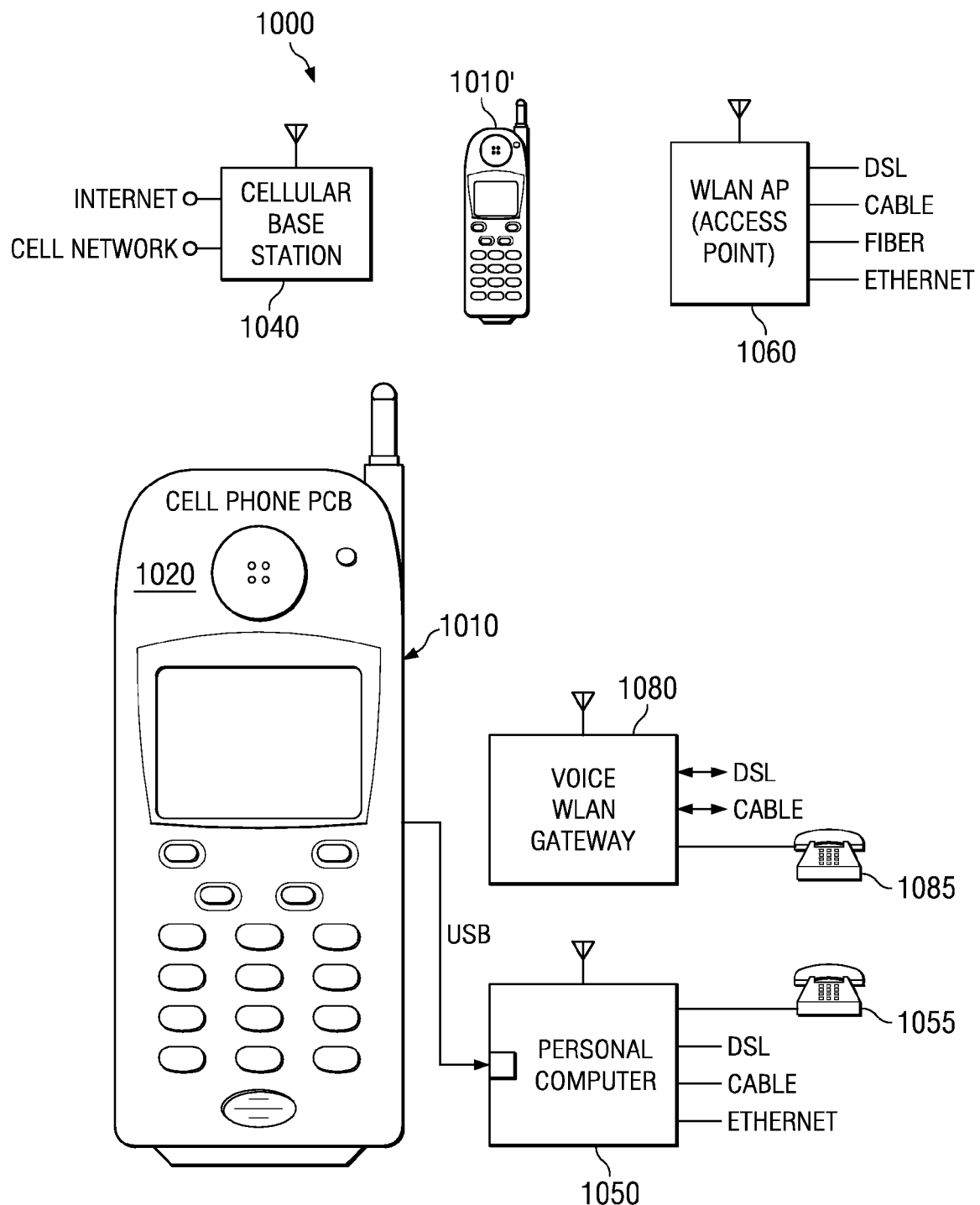
FIG. 1 is a pictorial diagram of a communications system including a cellular base station, two cellular telephone handsets, a WLAN AP (wireless local area network access point), a WLAN gateway with VoIP phone, a personal computer (PC) with another VoIP phone, a WLAN station on the PC, and any one, some or all of the foregoing improved according to the invention.

In FIG. 1, an improved communications system 1000 has system blocks with increased resistance to unauthorized packets, increased metrics of performance and features per milliwatt of power dissipation, instruction cycles per milliwatt, features per unit cost of manufacture, and greater throughput of authorized packets per cycle, among other advantages.

Any or all of the system blocks, such as cellular mobile telephone and data handsets 1010 and 1010', a cellular (telephony and data) base station 1040, a WLAN AP (wireless local area network access point, IEEE 802.11 or otherwise) 1060, a Voice WLAN gateway 1080 with user voice over packet telephone 1085, and a voice enabled personal computer (PC) 1050 with another user voice over packet (VoP) telephone 1055 and/or VoP PBX (private branch exchange), communicate with each other in communications system 1000. Each of the system blocks 1010, 1010', 1040, 1050, 1060, 1080 is provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 1040 two-way communicates with the handsets 1010, 1010', with the Internet, with cellular communications networks and with PSTN (public switched telephone network).

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and entertainment appropriate to the just-listed and other particular applications, while recognizing market demand for different levels of security.

The embodiments, applications and system blocks disclosed herein are suitably implemented in fixed, portable, mobile, automotive, seaborne, and airborne, communications, control, set top box, and other apparatus. The personal computer (PC) is suitably implemented in any form factor such as desktop, laptop, palmtop, organizer, mobile phone handset, PDA personal digital assistant, internet appliance, wearable computer, personal area network, or other type.

Figure 2:
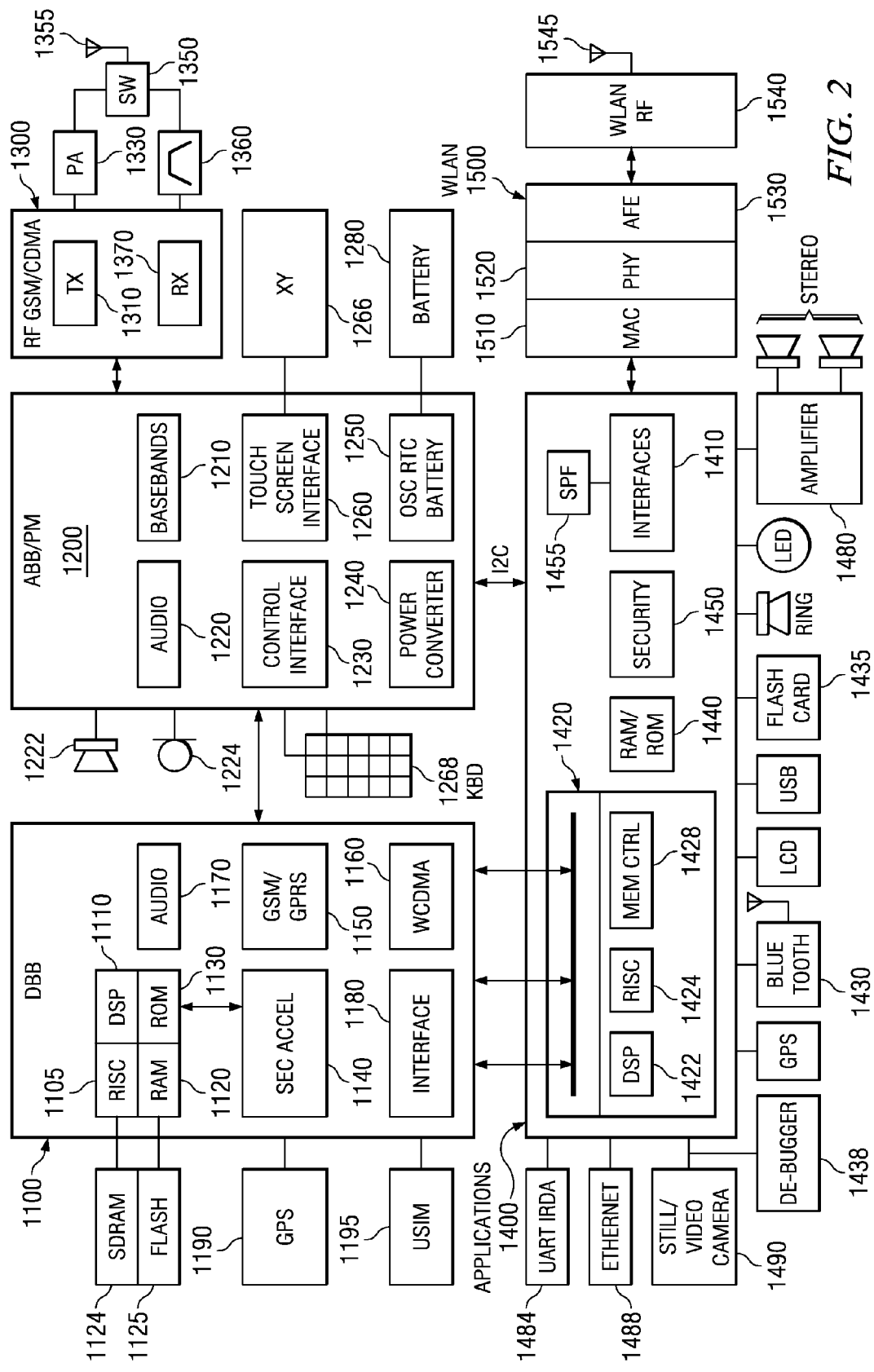
FIG. 2 is a block diagram of an inventive integrated circuit chip with any subset or all of the chip circuits for use in the blocks of the communications system of FIG. 1.

For example, handset 1010 is improved and remains interoperable and able to communicate with all other similarly improved and unimproved system blocks of communications system 1000. On a cell phone printed circuit board (PCB) 1020 in handset 1010, FIGS. 1 and 2 show a processor integrated circuit and a serial interface such as a USB interface connected by a USB line to the personal computer 1050. Reception of software, intercommunication and updating of information are provided between the personal computer 1050 (or other originating sources external to the handset 1010) and the handset 1010. Such intercommunication and updating also occur automatically and/or on request via WLAN, Bluetooth, or other wireless circuitry.

FIG. 2 illustrates inventive integrated circuit chips including chips 1100, 1200, 1300, 1400, 1500 for use in the blocks of the communications system 1000 of FIG. 1. The skilled worker uses and adapts the integrated circuits to the particular parts of the communications system 1000 as appropriate to the functions intended. For conciseness of description, the integrated circuits are described with particular reference to use of all of them in the cellular telephone handsets 1010 and 1010' by way of example.

It is contemplated that the skilled worker uses each of the integrated circuits shown in FIG. 2, or such selection from the complement of blocks therein provided into appropriate other integrated circuit chips, in a manner optimally combined or partitioned between the chips, to the extent needed by any of the applications supported by the cellular telephone base station 1040, personal computer(s) 1050 equipped with WLAN, WLAN access point 1060 and Voice WLAN gateway 1080 with Voice over packet telephone 1085 and/or VoP PBX, as well as radios and televisions, fixed and portable entertainment units, routers, pagers, personal digital assistants (PDA), organizers, scanners, faxes, copiers, household appliances, office appliances, combinations thereof, and other application products now known or hereafter devised in which there is desired increased, partitioned or selectively determinable advantages as described herein.

In FIG. 2, an integrated circuit 1100 includes a digital baseband (DBB) block 1110 that has a RISC processor (such as MIPS core, ARM processor, or other suitable processor) 1105, a digital signal processor (DSP) 1110, communications software and security software for any such processor or core, security accelerators 1140, and a memory controller. The memory controller interfaces the RISC and the DSP to Flash memory 1125 and SDRAM 1124 (synchronous dynamic random access memory). The memories are improved by any one or more of the processes herein. On chip RAM 1120 and on-chip ROM 1130 also are accessible to the processors 1105 and 1110 for providing sequences of software instructions and data thereto.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via the analog baseband chip 1200 and GSM transmit/receive chip 1300. Digital circuitry 1150 includes ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA) wireless with or without an HSDPA/HSUPA (High Speed Downlink Packet Access, High Speed Uplink Packet Access) (or 1xEV-DV, 1xEV-DO or 3xEV-DV) data feature via the analog baseband chip 1200 and the CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Block ENC has blocks for uplink and downlink supporting confidentiality processes of WCDMA.

Audio/voice block 1170 supports audio and voice functions and interfacing. Applications interface block 1180 couples the digital baseband 1110 to the applications processor 1400. Also, a serial interface in block 1180 interfaces from parallel digital busses on chip 1100 to USB (Universal Serial Bus) of a PC (personal computer) 1050. The serial interface includes UARTs (universal asynchronous receiver/transmitter circuit) for performing the conversion of data between parallel and serial lines. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 2, a mixed-signal integrated circuit 1200 includes an analog baseband (ABB) block 1210 for GSM/GPRS/EDGE/UMTS which includes SPI (Serial Port Interface), digital-to-analog/analog-to-digital conversion DAC/ADC block, and RF (radio frequency) Control pertaining to GSM/GPRS/EDGE/UMTS and coupled to RF (GSM etc.) chip 1300. Block 1210 suitably provides an analogous ABB for WCDMA wireless and any associated HSDPA data (or 1xEV-DV, 1xEV-DO or 3xEV-DV data and/or voice) with its respective SPI (Serial Port Interface), digital-to-analog conversion DAC/ADC block, and RF Control pertaining to WCDMA and coupled to RF (WCDMA) chip 1300.

An audio block 1220 has audio I/O (input/output) circuits to a speaker 1222, a microphone 1224, and headphones (not shown). Audio block 1220 is coupled to a voice codec and a stereo DAC (digital to analog converter), which in turn have the signal path coupled to the baseband block 1210 with suitable encryption/decryption activated or not.

A control interface 1230 has a primary host interface (I/F) and a secondary host interface to DBB-related integrated circuit 1100 of FIG. 2 for the respective GSM and WCDMA paths. The integrated circuit 1200 is also interfaced to an I2C port of applications processor chip 1400 of FIG. 2. Control interface 1230 is also coupled via access arbitration circuitry to the interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine shown between the power conversion block 1240 and circuits 1250.

Circuits 1250 provide oscillator circuitry for clocking chip 1200. The oscillators have frequencies determined by respective crystals. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip. A keyboard 1268 is also coupled to integrated circuit 1200.

Batteries such as a lithium-ion battery 1280 and backup battery provide power to the system and battery data to circuit 1250 on suitably provided separate lines from the battery pack. When needed, the battery 1280 also receives charging current from the Battery Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine.

In FIG. 2 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives an off-chip dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 2, an integrated circuit chip 1400 is provided for applications processing and more off-chip peripherals. On chip 1400 are found a high-speed WLAN 802.11a/b/g interface circuit 1410 coupled to a WLAN chip 1500. Further provided on chip 1400 is an applications processing section 1420 which includes a RISC processor 1424 (such as MIPS core, ARM processor, or other suitable processor), a digital signal processor 1422 (DSP), and a shared memory controller with DMA (direct memory access), and a 2D (two-dimensional display) graphic accelerator.

The RISC processor 1424 and the DSP 1422 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, a shared memory controller 1428 in circuitry 1420 interfaces the RISC processor and the DSP via an on-chip bus to on-chip memory 1440 with RAM and ROM. A 2D graphic accelerator is coupled to frame buffer internal SRAM (static random access memory) in block 1440. A security block 1450 includes secure hardware accelerators having security features and provided for accelerating encryption and decryption of any one or more types known in the art or hereafter devised. A packet filter block 1455 provides one or more packet filters to detect and drop unauthorized packets as described in further detail in connection with succeeding Figures herein.

On-chip peripherals and additional interfaces 1410 include UART data interface and MCSI (Multi-Channel Serial Interface) voice wireless interface for an off-chip IEEE 802.15 ("Bluetooth" and high and low rate piconet and personal network communications) wireless circuit 1430. Debug messaging and serial interfacing are also available through the UART. A JTAG emulation interface couples to an off-chip emulator Debugger 1438 for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to off-chip Audio codec, a touch-screen controller, and audio amplifier 1480 to stereo speakers. External audio content and touch screen (in/out) are suitably provided. Additionally, an on-chip USB OTG interface couples to off-chip Host and Client devices. These USB communications are suitably directed outside handset 1010 such as to PC 1050 (personal computer) and/or from PC 1050 to update the handset 1010.

An on-chip UART/IrDA (infrared data) interface in interfaces 1410 couples to off-chip GPS (global positioning system) and Fast IrDA 1484 infrared wireless communications device.

Packets for voice and/or data are coupled and interfaced to any suitable wireline gateway and/or network 1488 such as Ethernet, ATM, DSL, cable, satellite, and any other suitable packet source/destination. In addition, packets are suitably coupled to any wireless modem such as cellular modem provided by circuits 1100, 1200, 1300, and/or a WLAN modem 1500, 1540, WiMax, Bluetooth, infrared, optical, and other wireless modems. For example, packets according to IP, Ethernet VLAN, ATM and other protocols are suitably transferred through such wireless modems.

An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller and associated PWL (Pulse-Width Light) block in interfaces 1410 are coupled to a color LCD display and its LCD light controller off-chip.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for BARKER coding, CCK, and OFDM. PHY 1520 receives PHY Clocks from a clock generation block supplied with suitable off-chip host clock, such as at 13, 16.8, 19.2, 26, or 38.4 MHz. These clocks are often found in cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver and power amplifier and has low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). Security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2. Still other additional wireless interfaces such as for wideband wireless such as IEEE 802.16 "WiMAX" mesh networking and other standards are suitably provided and coupled to the applications processor integrated circuit 1400 and other processors in the system.

Since an IP Phone is a network device, it can encounter incoming malformed frames or a packet flood, thereby potentially leading to denial of service (DoS). Voice communication generally benefits from consistent and reliable bandwidth. DoS packets consume processor cycles, thereby potentially impairing voice quality and even degrading non-voice related applications running on a processor. Denial of service attacks attempt to exploit any vulnerability existing within protocol domains, wherein the attacker uses sophisticated tools and data patterns to create data packets intended to exploit loopholes and thereby paralyze a particular resource.

A static packet monitoring and filtering system is advantageously provided for resisting and combating various kinds of attacks on VoIP phones and other systems. One type of embodiment provides a hardware based filter that works in real-time to monitor incoming packets, detect malformed and/or malicious packets and drop them. VoIP phones are thereby made resilient and resistant to network attacks. Some embodiments use a hardware solution, which advantageously does not take up additional resources from an associated host processor. Other embodiments use a software, firmware or mixed hardware/software/firmware approach. The packet monitoring filtering mechanism detects and determines if some packets or even each incoming packet should be identified as part of DoS attack traffic. Such detected and identified packets are dropped by the filter on the fly, thereby protecting the rest of the system from such identified packets.

An embodiment of the packet filtering structures and processes described looks within a packet frame for certain types of DoS packets involved in a non-rate-based attack. In a Land attack, one example, the source and destination IP addresses of an incoming packet have been loaded with the same address value. The packet filtering embodiment compares the source IP address with the destination IP address of the packet. If the two addresses are the same value, the packet is logged and dropped. In other words, a packet filtering structure and/or process example not only checks the rate of packets coming in, but also intelligently looks inside the packets and analyzes their contents according to rules that screen out various kinds of attacks and other unwanted packets. To counter a variety of attack types, either or both of rate checking and various kinds of internal analyses of packets are selectively configured and performed in real time on the incoming packets.

The static packet filter checks the contents of packets and then drops packets on-the-fly as they pass through the filter without loading up any buffer memory. While some embodiments do usefully employ buffer memory, other embodiments obviate data and rate limitations associated with buffer memory, and avoid occupying chip real estate with buffer memory by omitting the buffer memory entirely and thereby performing packet filtering without a buffer memory.

Some packet filter embodiments are configurable directly in hardware or software or through a host processor to establish, modify and update one or more lists of approved network packet sources and/or lists of disapproved network packet sources. Sources in some embodiments are suitably individually tracked and information about packets is suitably logged on a per-source basis.

Packets are suitably monitored and dropped, or not dropped, serially or in parallel in different embodiments. Packet analysis rule sets are suitably applied in parallel, or serially, or in a sequence of serial and parallel operations depending on particular packets and efficient ways of monitoring them. Where a plurality of rule sets overlap, the rules that the plurality of rule sets have in common are suitably applied once in some embodiments instead of in a plurality of operations.

Figure 3:
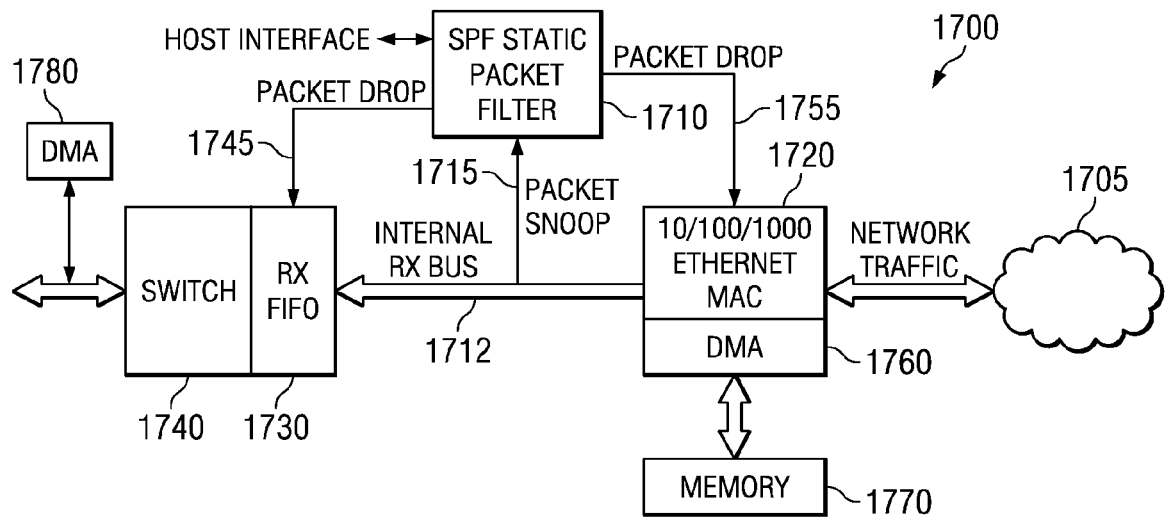
FIG. 3 is a block diagram of an inventive packet filter coupled to networking and other system blocks of an improved system.

In FIG. 3, an example of a packet communication system 1700 is connected to a network 1705 through one or more Ethernet links. Network traffic packets enter the system 1700 through an Ethernet front-end 1720 that has a physical layer (PHY), and a data link layer called a media access control (MAC). Ethernet front-end 1720 is connected to an internal data bus 1712 and a FIFO 1730 and thence an Ethernet switch 1740. A programmable processor system, a packet system on a chip (SOC), VoIP ASIC (application specific integrated circuit), and other integrated circuit device(s) are used as various platforms for implementing blocks of or in the packet communication system 1700.

Further in system 1700 a packet filter block 1710 interfaces with the Ethernet MAC 1720 via a packet snoop path 1715 and monitors the incoming stream of packet data for any packets that could potentially be a threat to the system 1700. The packet filter block 1710 is provided with circuitry and/or software called a Static Packet Filter (SPF) herein. Packet filter block 1710 signals the receive RX FIFO 1730 and/or the Ethernet MAC 1720 by Packet Drop lines 1745 and/or 1755 to drop such packets.

In one category of embodiments, the packet filter SPF 1710 examines each incoming packet independent of the other packets that arrive before or after the current packet. The incoming packets are, for example arriving at a speed of up to 1000 Mbps (megabits per second) in the case of a Gigabit Ethernet system, or at any suitable higher or lower bit rate or clock speed.

The packet filter 1710 snoops or monitors the data bus 1712 via the packet snoop line 1715. Packet filter 1710 then determines whether the packet should be dropped. A signal called a Packet Drop signal herein is enabled for the packet that is to be dropped and delivered on one or both of lines 1745 and 1755.

In some other embodiments, the packet filter 1710 examines at least some incoming packets in a way that is dependent on information derived from other packets that arrive before or after the current packet. The packet drop signal is enabled based on information about the packet itself and the other packets.

The decision to drop (Packet Drop signal issued active) or not is based, for instance, on a set of rules that are designed into the packet filter hardware, software or combination thereof. Each incoming packet is checked against the rules. If any of the rules is violated, the packet drop flag is raised and/or the packet drop signal is activated. The rules are based upon a known or predetermined list or dynamically updated list of DoS attacks that are used frequently or infrequently in attempts to bring down network devices and degrade their service or render them useless. Other embodiments use sampling operations to selectively examine packets of certain types or in certain time windows established either statically or dynamically.

In FIG. 3, described in further detail, packet filter 1710 is coupled by a snoop line 1715 to a bus between a 10/100/1000 Ethernet MAC 1720 (media access controller), and a receive FIFO (first-in-first-out queue) 1730 for an Ethernet switch 1740. A Packet Drop output line 1745 from SPF unit 1710 suitably goes to a control input of RX FIFO 1730 to cause the RX FIFO 1730 to fail to clock in the packet or to affirmatively erase it. The packet filter 1710 completes its decision making processes before the end of the packet is reached.

In FIG. 3, a Packet Drop output line 1755 is also routed to the MAC. In some systems, the MAC will already be done with the packet in situations where SPF provides Packet Drop signal a cycle or more after the packet is over. However, in other systems and for MACs that include a DMA module 1760 entity that transfers packet to a system memory 1770, the MAC 1720 and/or DMA 1760 suitably is coupled to and uses the Packet Drop signal to decide whether or not to transfer a packet. If MAC DMA 1760 has already started a transfer, then MAC DMA 1760 uses the Packet Drop signal to invalidate the packet and reuse the memory 1770 space for a next packet.

In some systems, the RX FIFO 1730 accepts the packet and sends it to a switching engine in an Ethernet switch 1740 before the Packet Drop signal is issued by Packet Filter 1710. The SPF and the Packet Drop signal still are useful in such cases by structuring the RX FIFO 1730 logic to also couple the Packet Drop signal to the Ethernet switching engine 1740. The Ethernet switching engine 1740 logic is structured to respond to the Packet Drop signal to discard the packet.

Packet accept/drop circuitry in the SPF drops packets on the fly, by operating at the speed of the bus clock or otherwise fast enough to keep up with incoming packets. In one type of embodiment, unauthorized packets are filtered out by the SPF and are prevented from reaching the RX FIFO 1730 by situating the SPF in the path between the MAC 1720 and RX FIFO 1730. In another type of embodiment, unauthorized packets or portions thereof reach the RX FIFO 1730. The RX FIFO 1730 responds to Packet Drop signal 1745 to either fail to clock the packet portions into RX FIFO 1730 or affirmatively erase or overwrite the packet portions from the input stage of RX FIFO 1730.

Where the external interface circuitry is an Ethernet switch 1740, then the Packet Drop signal is used to discard the packet when switching decision is made. Where the external interface circuitry is a DMA module 1780, then the dropped packet is not transferred to the memory that would otherwise receive the packet from the DMA module 1780. The on-the-fly feature is important because in either case of switch 1740 or DMA 1780, the unauthorized packet is advantageously not processed significantly if it is destined to be discarded. The on-the-fly feature saves internal bus bandwidth that would be consumed by DMA 1780 unnecessarily transferring the unauthorized packet to memory. In the case of a switch 1740, dropping an unauthorized packet frees up time for the internal decision logic in the switch to process authorized packets. SPF 1710 is advantageously made fast enough to provide the Packet Drop signal before the deadline is up.

In other words, it is emphasized that the end entity that erases or actually discards the packet is any suitable architectural block such as the MAC 1720, the MAC DMA 1760, the packet filter 1710 itself, the RX FIFO 1730, the succeeding block such as Ethernet switch 1740, or a system DMA 1780, or otherwise. Packet Filter 1710 benefits the system 1700 by coupling the Packet Drop signal to any point in the system where some system processing that would otherwise be performed on unauthorized packets is thereupon disabled, prevented, erased, invalidated, bypassed, obviated or otherwise reduced, minimized or eliminated. The packet filter is also applicable in all other packet systems besides Ethernet to which its features commend its use.

Figure 4:
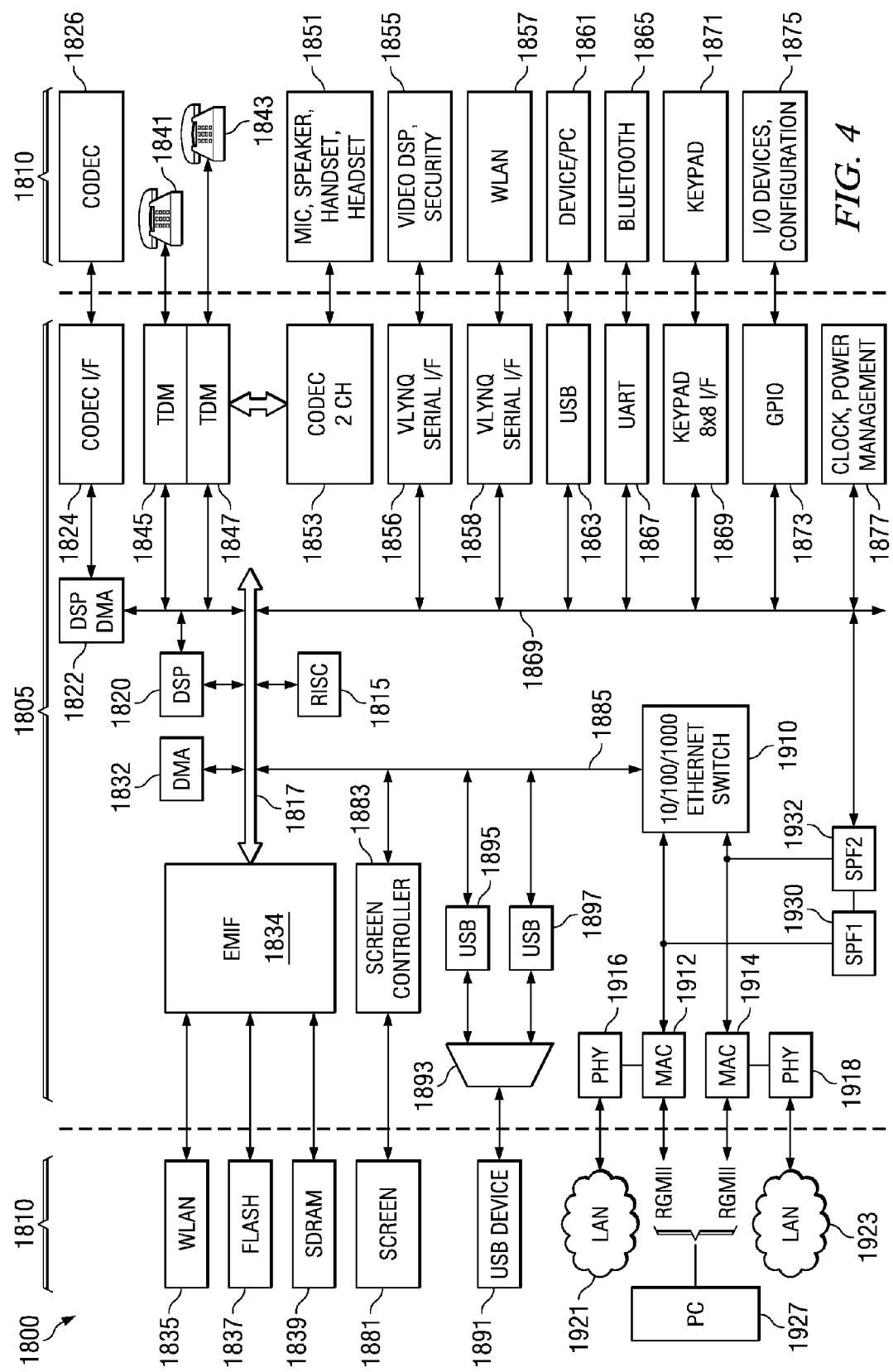
FIG. 4 is a block diagram of an inventive voice over packet telephone unit with peripherals using an inventive integrated circuit having two inventive packet filters.

In FIG. 4, an attack-resistant multi-application VoIP (Voice over Internet Protocol) phone 1800 embodiment has an integrated circuit 1805 and peripherals 1810. In various alternative embodiments, the VoIP phone 1800 is partitioned into integrated circuits suitably for the applications at hand. In some embodiments the VoIP phone is wireless and has circuit blocks from FIG. 2 for wireless and additional applications as desired. A RISC processor 1815 for communication control and processing functions is coupled to a bus 1817. RISC processor 1815 has RAM and ROM memory.

A DSP (digital signal processor) 1820 is also coupled to bus 1817. The DSP 1820 is suitably processor in a TMS320C5x™ DSP generation or TMS320C6x™ DSP generation from Texas Instruments Incorporated or some other processor product from another manufacturer. DSP 1820 performs high speed digital signal processing such as for voice codec processing and communications modem processing. DSP 1820 has RAM and ROM memory. A DSP DMA 1822 is coupled to DSP 1820 and bus 1817 for direct memory access operations with a codec interface 1824 that is coupled to an off-chip codec 1826.

A second DMA 1832 is coupled along bus 1817 to an external memory interface (EMIF) block 1834 which is coupled to an off-chip WLAN modem 1835, flash memory 1837, and SDRAM (synchronous dynamic random access memory) 1839. System memory is provided by SDRAM 1839.

In FIG. 4, VoIP telephone sets 1841 and 1843 are respectively coupled to bus 1817 via TDM interfaces 1845 and 1847. Also, microphone, speaker, handset, and headset devices collectively given numeral 1851 are coupled to TDM 1847 via a multi-channel codec 1853. Video DSP and security 1855 are coupled via a high speed serial interface 1856, such as a VLYNQ™ serial interface from Texas Instruments Incorporated, to a peripheral bus 1859 coupled to bus 1817. A WLAN modem 1857 is provided alternatively to or in addition to WLAN modem 1835. WLAN modem 1857 is coupled to bus 1859 via a VLYNQ™ serial interface 1858.

A personal computer, or a consumer entertainment device such as an audio player or other such device or peripheral 1861, is connected via a USB serial interface 1863 to peripheral bus 1859. A short distance wireless modem such as Bluetooth modem 1865 is connected via a UART 1867 to peripheral bus 1859. A keypad 1871 is also connected by a keypad interface 1869 to the peripheral bus 1859. Other input/output I/O devices 1875 and configuration switches and hard-wired configuration connections to a printed circuit board (not shown) for the system are coupled by a GPIO general purpose input/output circuit 1873 to the peripheral bus 1859. Clock and power management circuitry 1877 is also coupled to the peripheral bus 1859.

A display screen 1881 is coupled by a screen control 1883 to a bus 1885 that couples to bus 1817. USB device(s) 1891 are suitably coupled via a mux 1893 to USB interfaces 1895 and 1897 for fast coupling onto the bus 1885 that couples to bus 1817.

Ethernet packet communications are switched by an Ethernet switch 1910 which provides communications at 10/100 megabit and one/ten gigabit Ethernet speeds and other Ethernet speeds. Other embodiments contemplated use protocols other than Ethernet, in addition to Ethernet, or in a way complementing or incorporating Ethernet.

Ethernet switch 1910 is coupled off-chip along two channels provided by respective MAC blocks 1912 and 1914 and then respective PHY blocks 1916 and 1918. PHYs 1916 and 1918 are coupled to respective LAN (local area network) clouds 1921 and 1923. Each MAC block 1912 and 1914 additionally has a respective reduced gigabit media independent interface (RGMII) circuitry to couple by reduced pin count between the integrated circuit chip 1805 to gigabit Ethernet devices such as a PC (personal computer) and/or workstation 1927.

Ethernet switch 1910 is made resistant to DoS (Denial of Service) attacks, other unauthorized packets, and/or packets from unauthorized sources by first and second packet filters SPF1 1930 and SPF2 1932 coupled to each packet data input to the Ethernet switch 1910. Advantageously, the Ethernet switch 1910 is shielded from overloading from unauthorized packets, and the bandwidth of buses 1885, 1817 and 1859 is conserved. Moreover, the burden on RISC processor 1815 and DSP 1820 of handling handing data from unauthorized packets is substantially reduced.

Figure 5:
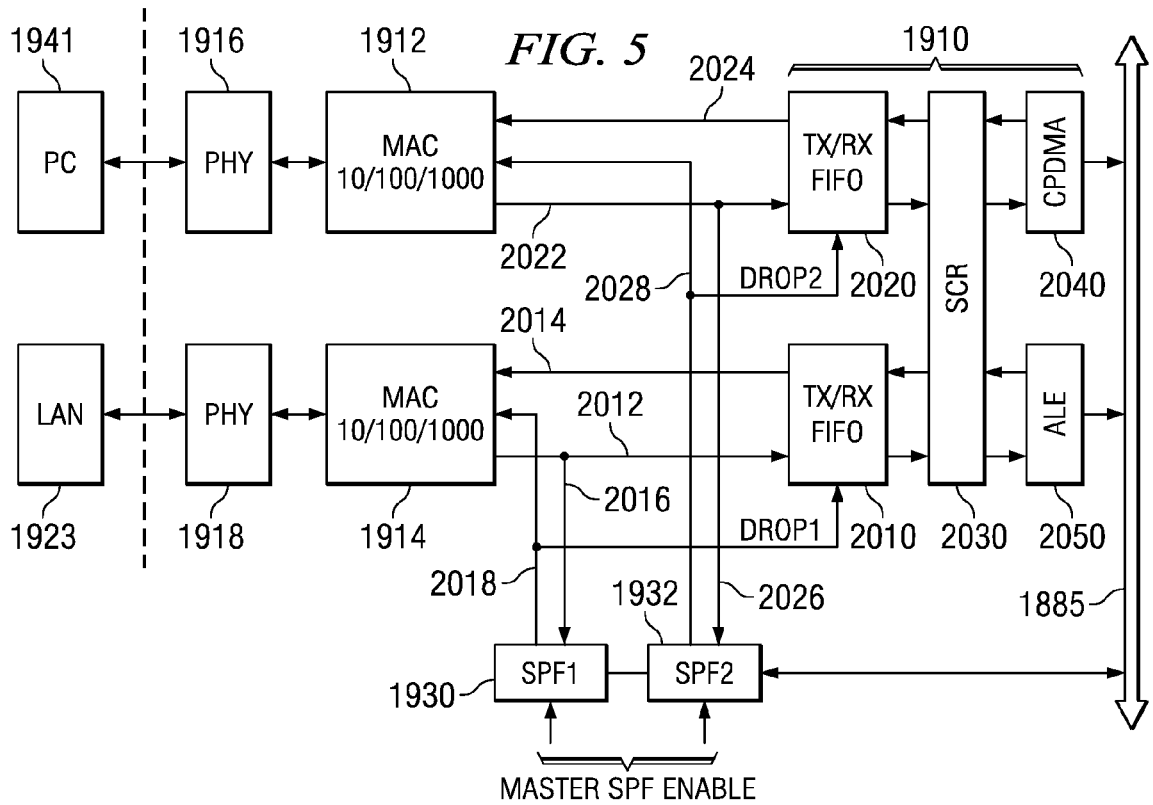
FIG. 5 is a block diagram of an inventive subsystem for use in the systems of FIGS. 1, 2 and 4 and other systems, and having an Ethernet switch and MAC (media access controller) with two inventive packet filters.

FIG. 5 shows a detail of circuitry of FIG. 4. Ethernet switch 1910 is coupled off-chip along two channels provided by respective MAC blocks 1912 and 1914 and then to respective PHY blocks 1916 and 1918. PHYs 1916 and 1918 are coupled to a PC 1941 in FIG. 5 as well as LAN 1923.

Ethernet switch 1910 has transmit/receive TX/RX FIFO blocks 2010 and 2020 bi-directionally coupled respectively to MAC 1914 and MAC 1912. TX/RX FIFO blocks 2010 and 2020 are also bi-directionally coupled to a Switched Central Resource SCR block 2030 which provides switching and master/slave controls. SCR block 2030 is bidirectionally coupled to a Communications Processing DMA block CPDMA 2040 for efficiently performing direct memory accesses for the Ethernet switch 1910. CPDMA in turn is connected to bus 1885 on-chip. SCR block 2030 is also bidirectionally coupled to an Address Lookup Engine ALE block 2050 which in turn is connected to bus 1885 on-chip.

MAC 1914 sends packets to an RX FIFO in block 2010 along a bus 2012 and receives packets from TX FIFO in block 2010 along a bus 2014. MAC 1912 sends packets to an RX FIFO in block 2020 along a bus 2022 and receives packets from TX FIFO in block 2020 along a bus 2024.

In FIG. 5, packet filters SPF1 1930 and SPF2 1932 have packet snoop inputs 2016 and 2026 coupled respectively to buses 2012 and 2022. Packet filters SPF1 1930 and SPF2 1932 supply Packet Drop outputs DROP1 2018 and DROP2 2028 respectively. DROP1 2018 from packet filter SPF1 is connected to RX FIFO of block 2010 and/or an input of MAC 1914. DROP2 2028 from packet filter SPF2 is connected to an input of RX FIFO of block 2020 and/or an input of MAC 1912.

When an unauthorized packet appears on bus 2012 or 2022, the respective packet filter SPF1 or SPF2 detects the unauthorized packet and sends a drop signal via line DROP1 2018 or DROP2 2028 to prevent further use of the packet at RX FIFO in block 2010 or RXFIFO in block 2020.

In FIG. 5, statistics from the SPFs 1930 and 1932 are accessible and communicated to bus 1885 (or bus 1859 as in FIG. 4) by a Host Interface (e.g., 2530 in FIG. 6) in the packet filter SPF. The SPF Host Interface and the CPDMA 2040 are kept from contending with each other for the bus 1885 by a switched central resource module in DMA 1832 of FIG. 4 that acts as a bus controller to arbitrate access to the bus 1885. Also, such SPF statistics communications with Host are relatively infrequent compared to packet communications on bus 1885.

The packet filter 1710 of FIG. 3 and packet filters 1930 and 1932 of FIGS. 4 and 5 are suitably provided in various embodiments.

Figure 6:
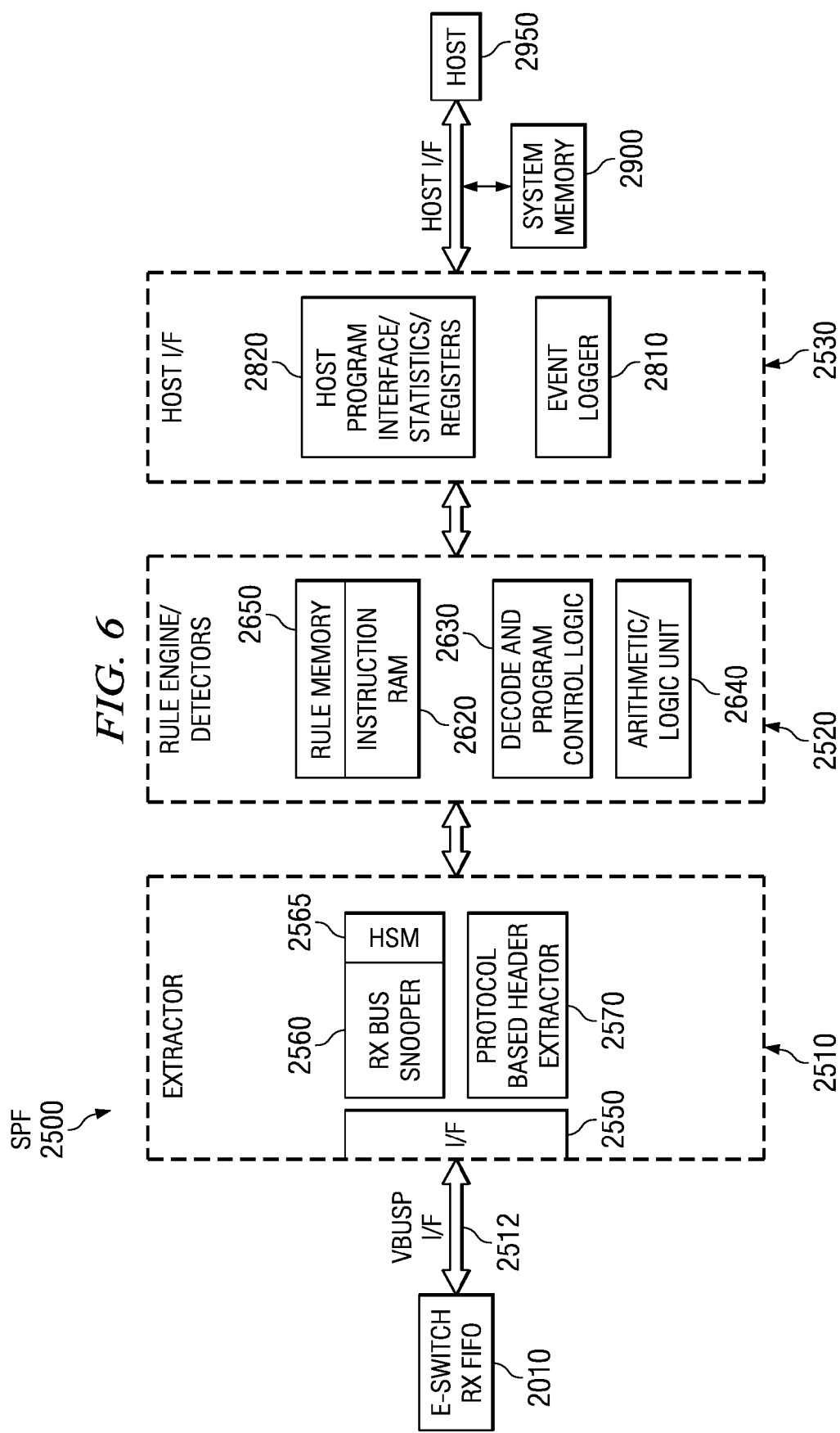
FIG. 6 is a block diagram of an inventive packet processor for use in the systems of FIGS. 1-5 and other systems.

In FIG. 6, a particular static packet filter embodiment SPF 2500 has an Extractor module 2510, Rule Engine/Detectors module 2520, and Host Interface (Host/IF) module 2530.

Extractor module 2510 snoops receive (RX) FIFO (first-in-first-out) data bus 2512 (compare to data bus 1712 of FIG. 3 and 2012, 2022 of FIG. 5), e.g., a bus with VBUSP bus protocol or other fast bus. The Extractor module 2510 extracts packet header information for different packet communications protocols such as TCP (Transmission Control Protocol), IP (Internet Protocol), ICMP (Internet Control Message Protocol), UDP (Universal Datagram Protocol), PPPoE (Point-to-Point over Ethernet), ATM (Asynchronous Transfer Mode) and its AALs (ATM Adaptation Layer protocols), and all other protocols to which the inventive embodiments are suitably adapted. Thus, Extractor 2510 provides a versatile protocol-based header extractor.

The receive bus 2512 has FIFO 2010 coupled to the MAC (media access controller) 1914 of the communications device to be protected, for example, a Gigabit Ethernet switch 1910 as shown. FIFO 2010 is not overloaded with ordinary traffic, but might be overloaded by a DoS attack. SPF 2500 drops DoS attack packets and thereby protects this FIFO 2010 from DoS attack packets reaching and overloading it.

Extractor 2510 has a bus interface 2550 monitoring multiple such receive FIFO (RFIFO) blocks 2010. Bus interface 2550 includes an external multiplexer coupled to each of the buses such as 2012 and 2022 of FIG. 5. In this way, the SPF 2500 circuitry is reused in such embodiments, and duplicate real estate for a second SPF is saved.

Another embodiment for the transmit bus snoops and drops selected packets from one or more transmit buses 2014 and 2024 of FIG. 5. In this way, if the transmit side of the Gigabit Ethernet device 1910 were itself caused to contribute to a DoS attack on other devices, then the DoS packets would be blocked or dropped prior to reaching the PHY from the transmitting MAC. A packet error warning is suitably output from the SPF 2500 when provided on either or both of the receive or transmit side.

In FIG. 6, the Rule Engine/Detectors module 2520 makes decisions about dropping the current packet based on possibility of DoS attack as determined from indicia of the current packet. The detector circuitry in block 2520 has hardware, firmware or software sub-modules 2520.1, 2520.2, . . . , 2520.i, . . . 2520.n. These detector submodules 2520.i each compare the incoming packet bits with the requirements of a respective rule set pertaining to a type of DoS attack to which the sub-module 2520.i corresponds.

A list of DoS attack types is listed in Tables 1 and 2. The detector sub-modules 2520.i are allocated, for example, to the attacks in the Tables so that sub-module 2520.1 checks incoming packets according to a rule set for ICMP Flood, sub-module 2520.2 checks incoming packets according to another rule set for Land attack, sub-module 2520.3 checks incoming packets according to another rule set for Fragment overrun attack, sub-module 2520.4 checks incoming packets according to another rule set for Jolt2 attack, etc.

The Host Interface module 2530 provides a programmable interface and performs event logging to provide event log information to the host processor 2950. The host processor 2950 functions are suitably provided in FIG. 2 by either RISC processor 1105 and/or 1424, by the debugger 1438, by PC 1050 connected by USB or WLAN, or by a remote PC or workstation otherwise connected by wireline modem or wireless modem. The host processor 2950 functions are suitably provided in FIG. 4 by RISC processor 1815 or remotely by PC 1927 connected as shown or otherwise connected by wireline or wireless modem. In FIG. 5, each SPF 1 and 2 is coupled to the bus 1885 to RISC processor 1815 of FIG. 4 as host.

The Host Interface 2530 of FIG. 6 includes host control registers and statistics registers. The Host Interface 2530 provides controllability and status information to RISC host processor 2950 software.

A master enable/disable bit is provided to top-level control/reset circuitry responsive to that bit in a control register in the SPF 2500. The master enable bit is suitably set in the SPF control register by the host such as a RISC processor 1815 of FIG. 4 to activate the SPF 2500. The SPF enable is made on-chip or otherwise internal to the system and relatively secure from adverse physical access or adverse remote access. Encryption and other additional security features of a different scope are suitably provided where it is desired to add even further security to prevent unauthorized disablement of SPF 2500.

The static packet filter 2500 provides an adaptive defense mechanism to resist attacks. In addition to detection of packets that match an existing attack type, the packet filter 2500 has built-in programmability that confers users the ability to configure additional checks. These configurable checks provide flexibility to address and deter against future to-be-discovered additional attack types in DoS and other attack categories.

Moreover, this approach also blocks packets that are not necessarily part of a DoS or other attack. For example, packets from specific network addresses are blocked. A limit is also configurably imposed on the amount of traffic that is acceptable on the phone in a given time interval. In this way, firewall capabilities and use configurations are advantageously established. This results in better reliability and quality of services for these chips and systems. The static packet filter 2500 is applicable not only to VoIP phones and gateways for wireline networks, but also to cellular telephones with or without VoIP, WLAN devices, gateways and other devices having a wireline or wireless network interface.

TABLE 1

DoS Attacks OSI Layer 3 - IP

| S.No | Attack Name | Scenario | Counter action |
|---|---|---|---|
| 1 | ICMP flood: Ping flood | L3. High incoming rate of ICMP packets | Software restricts the number of packets to be received in time slot, if packet exceeds in defined time slot, log and drop the packets. Same handles Smurf attack. A counter is loaded with a preset value and is decremented every time a ping (ICMP) message is received. If the counter value is zero, the packet is dropped. This counter is reloaded at the end of a programmed time interval. |
| 2 | Land | L3. Source and destination IP address of packet is same | Compare Source with destination IP address of packet, if same, log and drop the packet. |
| 3 | Fragment overrun | L3. Fragmented IP packet whose fragment Payload exceeds maximum IP total length | Calculate the fragment payload using fragment offset, log and drop if the length exceeds the maximum IP total length. |
| 4 | Jolt2 | L3. Actual length received is less than Total length stated in IP packet | Check if IP total length is greater than or equal to actual bytes (octets) received, else log and drop the packet. Drop if the length exceeds the maximum IP total length.$2^{16}$ |
| 5 | Tiny Fragment | Fragment packet having extremely little data | Software sets minimum fragment length to be received for non-last fragment, drop if the data is below threshold. |
| 6 | Illegal IP options | Malformed IP option(s) or options exceeding IP header space. | Parse and check all IP options present taking into account NOP |
| 7 | Fragmented ICMP packet | L3. Fragmented ICMP packet | If fragmented ICMP packet is received, log and drop the packet. |
| 8 | Illegal Fragment offset | L3. Fragment packet having offset as all 1's | Check for offset, drop If all bits are set in offset |
| 9 | Short ICMP packet | L3. Packet having IP total length less than ICMP header | check that IP total length covers complete ICMP header, else drop the packet |
| 10 | SSPing | L3. Fragmented ICMP packet, having fragment offset overlapping | If ICMP packet is fragmented, log and drop the packet. |
| 11 | Bonk | UDP fragmented packets at high rate having offset overlapping at different byte boundaries | Detect and remove overlapping, no dropping of packets. |

TABLE 1-continued

DoS Attacks OSI Layer 3 - IP

| S.No | Attack Name | Scenario | Counter action |
|---|---|---|---|
| 12 | ARP Flood | L2. ARP Counter loaded to preset value decrements to zero | Too many Acknowledgement Request Protocol requests in a time interval, counter reaches zero, drop further packets |
| 13 | IP Block | L3. IP addresses do not belong to specified sub-network addresses | Block packets. Log and drop packets. Use netmasks and IP Addresses in C0-C5 registers. |
| 14 | Jolt | L3 | Partially detectable (due to constraints in hardware) by checking the fragment offset and total length. Dropped when greater than $2^{16}$. |
| 15 | Micro Fragment | N/A. | Check if packet size is less than a normally expected size. This threshold is programmable. In addition, this value is overridden for the last fragment in a packet. |

TABLE 2

DoS Attacks Layer 4 - TCP/UDP

| Nr. | Attack Name | Scenario | Counter action |
|---|---|---|---|
| 1 | Illegal TCP options | L4 TCP options are malformed or exceed the TCP length space. | Checking sanity of TCP option by parsing each individual option taking into account NOP at any place. Covers Null Scan, FIN ACK, SYN FIN attacks. Drop if ALL = 0, or if FIN = ACK = 1, or if SYN = FIN = 1 |
| 2 | TCP SYN flood | L4. High rate of TCP SYN packets | Software restricts the number of TCP SYN packets to be received in defined time slot, if packet exceeds number in time slot, log and drop the packets |
| 3 | Null scan | TCP packet with no flag set | If packet is received with no flag set, log and drop the packet |
| 4 | Short TCP packet | Packet having IP total length less than TCP header | check that IP total length covers complete TCP header considering options, else log and drop the packet |
| 5 | FIN ACK | TCP packet with Finish and Ack flags set | Drop and log, if both finish and Ack flags are set. |
| 6 | SYN fragment | Fragmented TCP SYN packet | If TCP SYN packet is fragmented, log and drop the packet. |
| 7 | Urgent offset | TCP urgent offset pointing data out of current payload | Check for sanity of urgent offset, log and drop the packet if illegal. |
| 8 | Short UDP header | Packet having IP total length less than UDP header | check that IP total length covers complete UDP header considering options, else log and drop the packet |
| 9 | TCP SYN FIN | TCP packet with SYN and Finish flags set | Drop and log, if both SYN and finish flags are set. |
| 10 | Xmas Scan | L4 TCP packet bearing sequence number as zero with finish and urgent flags set, PSH = 1 | Drop and log if Xmas scan pattern is detected: TCP Sequence Number = 0 and FIN = URG = PSH = 1. |
| 11 | UDP Flood | L4. Limit rate of UDP packets of all types | Rate counter test. Drop and log packets. |
| 12 | UDP Chargen | L4. Port 19 generated continuous character stream. Possible spoof attack. | Rate counter test. Block Port 19. |
| 13 | Fraggle | L4. Similar to Smurf but UDP is the carrier protocol instead of ICMP | UDP Echo port (port 7) should be blocked or traffic limited. |
| 14 | TCP Echo | L4. TCP Port 7 is also an echo port | TCP Echo port (port 7) should be blocked or traffic limited. |

In FIG. 6, a receive FIFO 2010 of gigabit Ethernet switch 1910 of FIG. 5 is connected to the Static Packet Filter SPF 2500. The Static Packet Filter (SPF) provides protection against some of the most common forms of Denial of Service (DoS) attacks that exploit the Layer 3 and Layer 4 functions, for instance, of the network stack running on a system. The SPF architecture includes an Extractor block 2510 which is also called a packet parser herein. Extractor 2510 snoops the VBUS coupling the MAC to the RX FIFO of the Ethernet switch. The snooping by Extractor 2510 taps packet data. Extractor 2510 decodes Layer 3 and Layer 4 fields and presents the location of specific protocol headers to Detectors block 2520.

The Detectors block 2520 makes each decision to drop a packet based on possibility of DoS attack in the current packet. Detectors block 2520 is also called a Rule Engine herein. Detectors block 2520 is suitably provided as a single programmable processor, or as a set of parallel or series-parallel connected hardware detector modules. In one example embodiment of FIG. 7, a single programmable processor is disclosed. The programmable processor usefully has programmability to accommodate software updates, and the processor has architecture that works at high clock speeds. Embodiments with a set of parallel or series-parallel connected hardware detector modules provide extremely high clock speed of operation through a hardware-intensive approach.

Host Interface 2530 provides controllability and status information to host processor 2950 and its software. Host processor 2950 sets/clears the SPF master enable/disable bit in the Control Register, and Host Interface circuitry is responsive to that bit to activate the complete SPF Engine 2500. Host Interface 2530 provides individual statistics about dropped packet types for each bus to which Extractor 2510 is coupled (one bus in FIG. 6, two or more buses in a multiplexed embodiment). Host interface 2530 sets individual thresholds for logging packet parameters for diagnosis by Host 2950, and logs essential packet parameters for software diagnostics.

The packet filter 2500 frees up the host processor 2950 network stack. In this way, the packet filter 2500 frees up CPU cycles and confers system advantages of improved network security and higher voice and service quality on voice applications. Still further system advantages include running other processor applications faster and providing systems in some cases that include additional software applications to run on the processor in a given unit of time. In this way, a hardware based security system for VoIP phone chips, cell phone chips and other systems is provided and augmented.

An architecture embodiment of the Static Packet Filter (SPF) 2500 has increased programmability and software controllability. Examples of overall system connectivity are shown in FIGS. 2, 3, 4 and 5. The internal architecture is described in more detail in connection with FIG. 6. The SPF 2500 is architected to complete all decision making processes before the end of each packet is reached. The SPF 2500 also operates at the same clock frequency as the receiving bus RX VBUSP interface on the multi-port gigabit Ethernet switch such as at 125 MHz, for instance.

In FIG. 6, the block diagram of the SPF module has a packet parser 2510, an intrusion detector 2520, and a host interface 2530 to provide control and configuration access to a host processor and having an event logger to keep a log of filtered packets in system memory.

The packet parser 2510 has VBUSP (VBUS Protocol) interface 2550 coupled to a bus (e.g., VBUS 2512 herein) coupling a MAC 1914 to a receive FIFO 2010 of a three-port Ethernet switch 1910. Packet parser 2510 has a bus snooper module 2560 connected to the VBUSP interface 2550. Lines connected to VBUS as Receive inputs of VBUSP interface 2550 are VBUSP request, VBUSP address, VBUSP write data, and VBUSP write ready. Interface 2550 provides a Packet Drop output line and Packet Drop output signal on VBUS 2512.

A bus snooper module 2560 includes a Packet Buffer 2780 (an octet history buffer) that stores a predetermined number of the latest bytes (octets) of each packet or frame (e.g. 32 bytes). A protocol-based header extractor 2570 in packet parser 2510 responds to any of various network packet formats and determines the location of the header corresponding to each of specified protocols and stores the values in internal registers called Base registers B1-B4 that are respectively dedicated to one protocol each and are each loaded, if applicable, with the header location of the protocol(s) of headers found by the extractor in the packet. The extractor 2570 in one embodiment responds to PPPoE (Point-to-Point over Ethernet), IP, TCP, UDP and ICMP frame formats in the sense that it has circuitry operative to detect, parse and decode any of these packet header formats.

In FIG. 6, Detectors block 2520 is suitable for intrusion detection or other detection of unauthorized packets. Detectors block 2520 has a module that monitors information in the header fields at locations indicated by the packet parser 2510. If an abnormal combination of values is detected in these packet header fields, a DROP signal to drop the packet is issued to the external RX FIFO interface in block 2010.

The Detectors block 2520 also monitors the receive rate of a particular class of packets and limits the number of packets that actually pass through the systems of FIGS. 2, 3 and 5. In addition, the decision making done by the detection logic in Detector block 2520 is programmable and confers flexibility to perform a range of different checks on the contents of packet to determine whether or not it should be accepted. Detector block 2520 has a set of dedicated detectors or a programmable rule engine to check for malformed protocol header fields. This flexibility extends to the rate limiting feature, and the conditions that subject a packet to rate limit are also programmable.

Event logger 2810 captures a record of the activity in the packet filter 2500. In addition, based upon the settings programmed by the host 2950 software, the event logger 2810 writes detailed information about any frames that have been dropped thus far. This information is written to a part of system memory 2900 as configured by software in host 2950. Host interface 2530 has a slave interface to provide access by the host software to the SPF 2500 configuration registers and the rule engine memory 2650. In addition, host interface 2530 has a master interface to store activity logs from the SPF module 2530 to the system memory 1839. That master interface suitably performs a four 32-bit word burst write and need not perform a read access.

In a multiplexed embodiment, VBUSP Network Interface 2550 provides access to the receive (RX) network traffic on each Ethernet port. Two VBUSP network interfaces 2550.1 and 2550.2 are connected to SPF 2500, and one of these interfaces is selected either alternately or in response to configuration through host processor 2950 software. Each selected interface 2550.*i* is monitored for intrusion attack.

The selected VBUSP Network Interface 2550*i*. in one embodiment is a 64-bit interface running at 125 MHz or other rate established for it and conforms with an applicable bus protocol. Each incoming Ethernet frame is visible, eight bytes at a time, to SPF 2500 on this interface 2550.*i*. An address bus carries a value of 0x4 to denote beginning of a frame and a value of 0x8 for the end of a frame. The value on the address bus, in conjunction with data on the data bus and request bus, is used to monitor the network frames.

Extractor 2510 has a main control block called the bus snooper 2560 above that has a Header State Machine HSM 2565. Header State Machine 2565 is established to respond to the packet and triggers IP/TCP header extractor block 2570.

In block 2570 an IP header extractor sub-block decodes IP header fields according to RFC 791 format and presents them to the Detector block 2520. ("RFC" stands for Request for Comment and each numbered RFC is a publicly-available documentation reference in the accumulated technical documentation of the Internet itself.) Further in block 2570 is a transport header extractor sub-block that decodes TCP/ICMP header fields according RFC 793 format and presents their location in the packet to the Detector block 2520.

The protocol-based header extractor 2570 uses the incoming data to determine the location of various protocol headers in the current packet. The protocol-based header extractor 2570 obtains, from the contents of the VBUSP data bus, all the fields that are required to judge if the current packet could cause intrusion or Denial of Service in the trusted network. Such fields are in the protocol headers in the beginning of the packet, for instance. These fields are listed next for each of the network frame types in the network byte order.

An IP Header Format example by fields and number of bits is Version, 4 bits (IP Protocol Version); Internet Header Length, 4 bits (number of 32 bit words in header); Type of Service, 8 bits; Total Length, 16 bits (expressed as the number of octets); Identification, 1 bit; Flags, 3 bits; Fragment Offset, 13 bits (octet offset of current fragment in the packet); TTL (Time to Live), 8 bits; Protocol, 8 bits (indicates the next level protocol used); Header checksum, 16 bits (denotes the checksum of the Internet Header); Source Address, 32 bits; Destination Address, 32 bits.

A TCP Header Format example is Source Port, 16 bits; Destination Port, 16 bits; Sequence Number, 32 bits; Acknowledgment Number, 32 bits; Data Offset, 4 bits (number of 32 bit words in TCP header); Reserved, 6 bits; Control Bits, 6 bits (URG, ACK, PSH, RST, SYN, FIN); Window 16 bits; Checksum, 16 bits (one's complement of one's complement sum of all 16 bit words); Urgent Pointer, 16 bits (positive offset from the sequence number); Options, (variable length).

UDP Header starts in the IP Payload section. A UDP Header Format example is Source Port, 16 bits; Destination Port, 16 bits; Length, 16 bits; Checksum, 16 bits.

ICMP Header is located in the IP Payload field. An ICMP Header Format example is Type, 8 bits; Code, 8 bits; Checksum, 16 bits; Unused, 32 bits.

The Header State Machine HSM 2565 and the protocol-based state machines and circuits of block 2570 parse through each Ethernet frame taking into account the underlying protocol and output the header fields along with pulse type valid signals to host interface block 2530. Extractor 2510 also provides layer L3 and L4 byte offset values to the Rule Engine module in Detector 2520. Extractor 2510 supports VLAN (Virtual Local Area Network by added virtual channel tag field in Ethernet frame for using Ethernet as a network service layer), PPPoE, IP, TCP/UDP, and all other protocols to which its functionality and advantages commend it.

Figure 7:
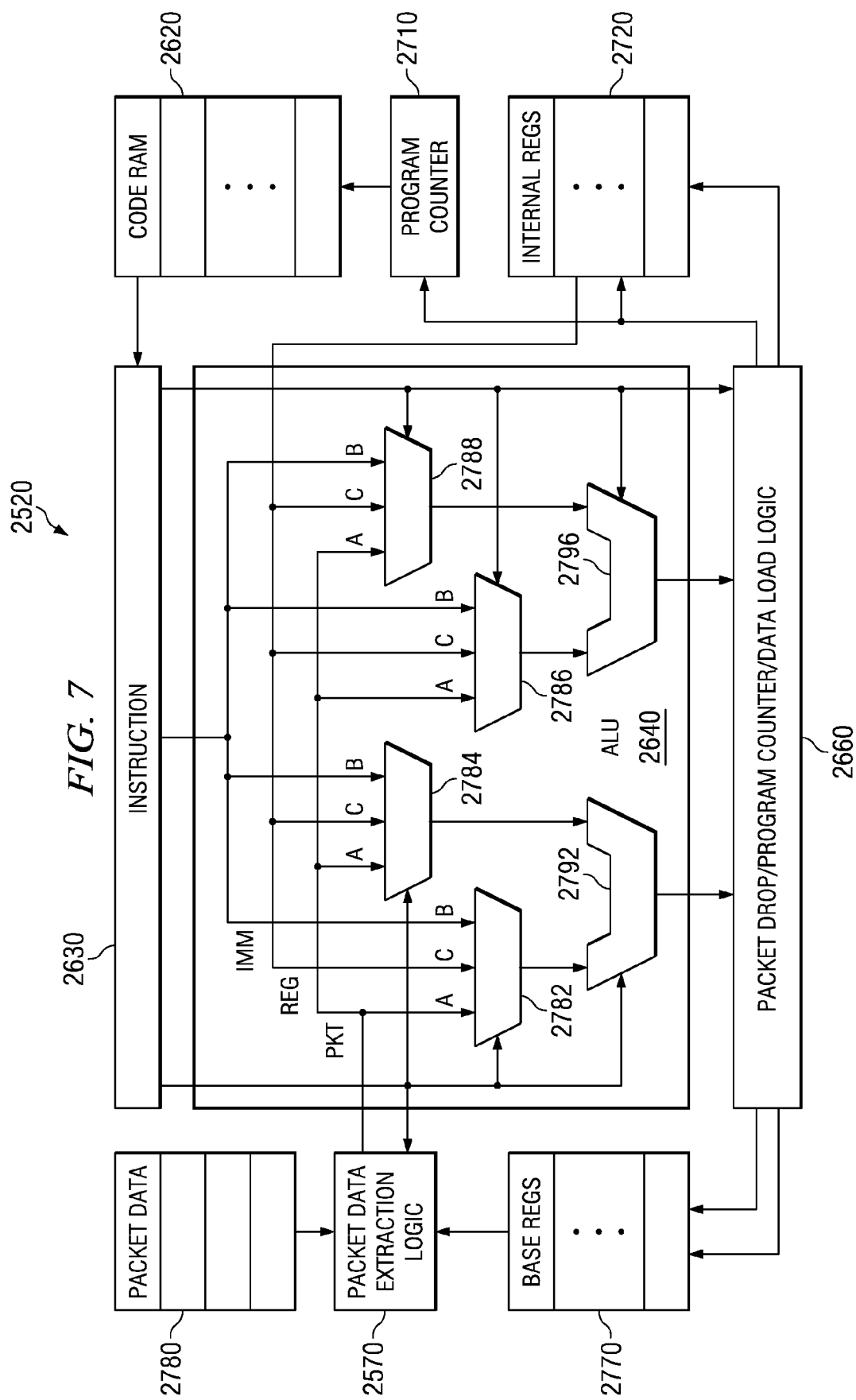
FIG. 7 is a partially block, partially schematic diagram of the inventive packet processor of FIG. 6 with a detail of a Detector block structured as a Rule Engine for detecting unauthorized packets to be dropped.

Referring to FIGS. 6 and 7, Extractor 2510 has a bus snooper 2560 having a FIFO packet buffer 2780 of FIG. 7. Packet buffer 2780 is organized as four stages that are each eight octets (bytes) wide. Packet buffer 2780 also provides packet data via packet data extraction logic 2570 for any operand in Table 7A that is a packet reference (uses information about a packet). Packet data extraction logic 2570 includes logic for determining the location of and accessing the octet(s) in the packet buffer 2780 that a current operand of a rule engine instruction in Table 7A is referencing by means an Offset value coded in the operand.

If one or more bits from any selected octet(s) from a packet are to be used as data called for by an operand in an instruction, then the rule engine calculates the index into the packet buffer 2780. This calculation is done based on the value of the given base address, offset and the mask value Bits#. The index is obtained by adding the base address and the offset to identify the last octet position that is extracted. From this location, a number of octets are retrieved, in effect working backwards, so that enough octets are available for the mask to operate on as specified by mask value Bits# according to TABLE 7A. From the Octet Counter value, the circuitry determines how deep an access pointer goes into the packet buffer 2780.

Suppose the Octet Counter value is 48 (latest octet received) and the rule engine instruction Base plus Offset adds up to 40, and mask Bits# needs 3 octets, then the extraction logic 2570 extracts octets 38, 39 and 40 as counted from the first octet in the packet header. Suppose further that the packet buffer physical positions are numbered 0-31 decimal (00-1F hex) respectively. Since the packet buffer holds the 32 latest octets, packet buffer 2780 holds packets 17-48 in positions 0-31 respectively. So the extraction logic 2570 effectively generates an address or pointer value and accesses octet locations 21-23 in the packet buffer to retrieve the operand data. The extraction logic accordingly generates a octet location 23 (31±40−48) equal to FIFO End Position plus Base plus Offset minus the Octet Counter value.

If the packet buffer internal addressing structure in effect amounts to numbering the positions 31-0 (reverse of the example above), then the logic of a corresponding embodiment generates the address simply as Octet Counter value minus sum of Base plus Offset. Since the buffer end position is zero, it is omitted from the calculation. The first octet address is 48−40=8, and if the mask needs 3 octets to work on, then octets 8, 9, 10 are retrieved.

As described, various embodiments can effectively use different logic implementations any of which operates as a function of the 1) running counter value such as a bit or bit-group count (e.g. octets), 2) Base code from the instruction, 3) Offset code from the instruction. The logic in some embodiments also operates a function of 4) masking code if any from the instruction, and 5) the FIFO octet addressing scheme based on its internal addressing structure (buffer position such as buffer end position to which the running counter pertains).

TABLE 3 shows the state machines for Header, IP and TCP/UDP in Extractor 2510, as described herein. The state machines, or any one of them, is an example of header-position determining circuitry.

TABLE 3

STATE MACHINE EXAMPLES

| State Machine State | Remarks |
| --- | --- |
| Header State Machine (HSM) | |
| IDLE | Idle, starting state. |
| ETH_HDR | Ethernet header detected. |
| VLAN_HDR | VLAN header detected. |
| PPP_HDR | PPPoE header detected. |
| IP_HDR | Internet Protocol header detected. Trigger IP Header Extraction State Machine. Skip packet signal is issued if no TCP/IP header. |
| IP_OPTION | Internet Protocol option state. |
| TRP_EXT | Transport header. Trigger TCP/UDP Transport Header Extr. State Machine |
| DELAY_TRP_EXT | Delay state re transport. |
| WAIT_FOR_EOF | Wait for end-of-frame. Issue end-of-packet signal. |
| PACKET_DONE | Packet done. Intermediate state on way to IDLE. |

TABLE 3-continued

STATE MACHINE EXAMPLES

| State Machine State | Remarks |
|---|---|
| IP Header Extraction State Machine | |
| IP_IDLE | Idle starting state in ring-shaped state transitions. |
| IP_ONE | First state after first clock. |
| IP_TWO | Second state after second clock. |
| IP_THREE | Third state after third clock. Then back to IP_IDLE. |
| TCP/UDP Transport Header Extraction State Machine | |
| TCPUDP_IDLE | Idle starting state in ring-shaped state transitions. |
| TCPUDP_ONE | First state after first clock. |
| TCPUDP_TWO | Second state after second clock. |
| TCPUDP_THREE | Third state after third clock. Then back to TCPUDP_IDLE. |

Header State Machine HSM 2565 in one embodiment has ten states: IDLE, ETH_HDR (Ethernet Header), VLAN_HDR, PPP_HDR, IP_HDR (Internet Protocol Extraction trigger), IP OPTION, TRP_EXT (Transport Protocol Extraction trigger), DELAY_TRP_EXT, WAIT_FOR_EOF (end of file), and PACKET_DONE.

Header State Machine HSM 2565 waits in IDLE state for start of frame to arrive. HSM 2565 transitions out of IDLE state in response to a predetermined Frame start address from the MAC of FIG. 3 or 5 on the VBUSP interface 2512 indicating start of new Ethernet Frame in this example. In this way, when the VBUSP address has bits representing frame start HSM 2565 transitions to the state ETH_HDR.

Now, HSM 2565 looks for an L2 header in the frame. HSM 2565 parses through the frame to determine the presence of PPPoE, VLAN or plain Ethernet frame headers, in order to determine the start offset of the IP header from the start of the frame. Those initial L2 header bits indicate the type of packet by protocol type. Depending on those L2 header bits, a transition is made to one of the states VLAN_HDR, PPP_HDR or IP_HDR. If the packet is neither VLAN, PPPoE nor IP, it is assumed unknown in this example, and no further SPF 2500 check of the packet is carried out. In such case, HSM 2565 transitions to WAIT_FOR_EOF, and then to PKT_DONE and back to IDLE. Whether or not the packet is dropped, by issuing a Packet Drop signal as well, is dependent upon the programming provided for the embodiment.

HSM 2565 is now described as in one of the states VLAN_HDR, PPP_HDR or IP_HDR. If the VLAN header passes testing, the HSM 2565 at state VLAN_HDR decodes the Ethernet frame protocol. If packet is PPPoE, the HSM 2565 state is PPP_HDR and the PPPoE header is parsed and the underlying protocol is detected. PPP session packets are further processed by the SPF 2500. HSM 2565 has thus acquired IP packet start offset, so transition from either VLAN_HDR or PPP_HDR or directly from ETH_HDR now takes HSM 2565 to the IP_HDR state.

State IP_HDR issues a trigger signal to activate an IP Header Extraction State Machine circuit in extractor 2570 to extract the contents of the IP header. The IP Header Extraction State Machine circuit in one example has a ring-shaped state transition diagram wherein this state machine advances from its own Idle state to three successive states with each clock cycle as each set of eight additional packet octets arrives. In each state, the latest eight packet octets are parsed and relevant data issued to the Detector block 2520. The IP header is further parsed to determine the presence of IP option(s) which if present need to be signaled and taken into account at HSM 2565 IP_OPTION state to subsequently determine TCP/UDP header start offset. Also, Source IP (SIP) address, Destination IP (DIP) address and Protocol fields are extracted from the IP header and sent to host logging module 2810 to be used by host software for diagnostics. Then, with the IP header now parsed, the IP Header Extraction State Machine in block 2570 reaches a Wait state and waits until the packet ends, whereupon IP Header Extraction State Machine returns to the initial Idle.

Suppose the HSM 2565 is currently in state IP_HDR. When the IP Header Extraction State Machine circuit in block 2570 is done, it signals a Done to HSM 2565. HSM 2565 checks for that Done signal and if IP options were signaled present, then HSM 2565 transitions to IP extraction options state IP_OPTION. IP extraction options circuitry increments a packet counter to determine TCP/UDP header start offset. TCP/UDP start offset is used to extract Transport Layer data called Source Port and Destination Port which are provided in turn to host software for diagnostics via event logger 2810. As thus described, HSM 2565 provides start offset of Layer 3 (IP header) and Layer 4 (TCP/UDP) to the Rule engine 2520. When IP options are executed, then a transition is made from state IP_OPTION to the state WAIT_FOR_EOF.

HSM 2565 state IP_HDR can originate other transitions besides to IP_OPTION. For instance, when the IP Header Extraction State Machine circuit in block 2570 is done, it signals Done to HSM 2565. If in addition to Done, a Skip Packet signal was also set active from block 2570, then HSM 2565 transitions from state IP_HDR to the state WAIT_FOR_EOF to skip the packet.

Another alternative transition from state IP_HDR occurs if a VLAN header was detected. Operations transition from state IP_HDR to the state TRP_EXT whereupon HSM 2565 issues a trigger signal to initiate operations of a TCP/UDP Transport Header Extraction State Machine circuit in block 2570. This TCP/UDP Transport Header Extraction State Machine parses the TCP or UDP header as eight packet-octets arrive and issues header field data thereby obtained as well as a Done signal in a manner analogous to the description herein for the IP Header Extraction State Machine. HSM 2565 responds to this Done signal to transition from state TRP_EXT to the state WAIT_FOR_EOF. If originally at state IP_HDR, a VLAN header was not detected, then a transition goes from state IP_HDR to state DELAY_TRP_EXT, whereupon as soon as the next set of eight packet-octets arrives, a further transition is made from DELAY_TRP_EXT to the state TRP_EXT which operates as already described.

When state WAIT_FOR_EOF is reached as described, the HSM 2565 waits for the packet to end as indicated by the predetermined packet ending code asserted on the VBUSP address bus when a packet ends. An end-of-packet signal is coupled to rule engine 2520 as well as Extractor 2510. In HSM 2565, when the packet is ended, a transition is made from the state WAIT_FOR_EOF to the state PKT_DONE whereupon the state machine HSM 2565 clears all internal flags and then transitions back to IDLE of HSM 2565.

If an unknown transport protocol is received or a fragment packet was received, then a Skip Packet signal is issued from the Protocol based header extractor logic 2570 to HSM 2565. The signal Skip Packet is generated if the packet is an IP Packet but does not encapsulate either a TCP or UDP frame. Among other things, Skip Packet signals the TCP/UDP extractor logic of the TCP/UDP Transport Header Extraction State Machine in block 2570 to skip parsing the Layer4 (TCP/UDP). If the IP Header Extraction State Machine in block 2570 does not give information about location of protocol headers, the rule engine 2520 does not process any instructions that require such information. In this embodiment, the Skip Packet circuitry and signal are independent from the Rule engine 2520 and from the logic that produces Packet Drop signal. When the skip packet signal is generated in block 2570, the Rule Engine 2520 does not get some of the header information to process. As a result, Rule Engine 2520 passes or skips the packet by not issuing Packet Drop. This is fine because unknown protocols and fragmented packets need no analysis and are passed through to switch 1910 and the rest of the system 1800 for other processing.

HSM 2565 also has logic to abort frame processing from any state of HSM 2565 and transition to PKT_DONE state if a predetermined frame abort code is sensed on the VBUSP interface 2512 from the MAC such as MAC 1914. The end of frame is available, eight bytes at a time, to SPF 2500 on this interface. The address bus carries a value of 0x4 to denote beginning of a frame, 0x0 for middle of frame, 0x8 for end of a frame and 0x10 to indicate aborted frame. The value of address bus in conjunction with the data bus and request bus is what is used to monitor the network frames. The extractor 2510 uses the incoming data to determine the location of various protocol headers in the current packet.

The data signals on the VBUSP RX data bus over multiple cycles are shown in TABLE 4 for an Ethernet frame encapsulating an IP/TCP packet. The IP packet header spans Ver/IHL ($3^{rd}$ row, col. 23:16) to Dest IP[7:0] ($5^{th}$ row, col. 47:40).

TABLE 4

| Multiple cycles of VBUSP Data Bus contents for a Ethernet/IP/TCP packet | | | | | | | |
|---|---|---|---|---|---|---|---|
| 63:56 | 55:48 | 47:40 | 39:32 | 31:24 | 23:16 | 15:8 | 7:0 |
| MAC-SA [39:32] | MAC-SA [47:40] | MAC-DA [7:0] | MAC-DA [15:8] | MAC-DA [23:16] | MAC-DA [31:24] | MAC-DA [39:32] | MAC-DA [47:40] |
| VLAN [7:0] | VLAN [15:8] | VLAN [23:16] | VLAN [31:24] | MAC-SA [7:0] | MAC-SA [15:8] | MAC-SA [23:16] | MAC-SA [31:24] |
| ID [7:0] | ID [15:8] | Total Len [7:0] | Total Len [15:8] | TOS [7:0] | Ver[3:0] IHL[3:0] | Len/Type [7:0] | Len/Type [15:8] |
| Source IP [23:16] | Source IP [31:24] | Checksum [7:0] | Checksum [15:8] | Protocol [7:0] | TTL [7:0] | Frag [7:0] | Flags[2:0] Frag[12:8] |
| Src Port [7:0] | Src Port [15:8] | Dest IP [7:0] | Dest IP [15:8] | Dest IP [23:16] | Dest IP [31:24] | Source IP [7:0] | Source IP [15:8] |
| Ack no [23:16] | Ack no [31:24] | Seq no [7:0] | Seq no [15:8] | Seq no [23:16] | Seq no [31:24] | Dest Port [7:0] | Dest Port [15:8] |
| Checksum [7:0] | Checksum [15:8] | Window [7:0] | Window [15:8] | TCP Flags [5:0] | Data offset | Ack no [7:0] | Ack no [15:8] |
| | | TCP Payload | | | | Urg Ptr [7:0] | Urg Ptr [15:8] | frame is thus determined by either 1) End of packet indication by MAC 1914 providing a predetermined End address code on the VBUSP interface, or 2) an Abort indication MAC 1914 putting a predetermined Abort code on the VBUSP interface.

In FIG. 6, bus snooper 2560 provides various signals in its operations: a ready-to-log-now signal to host interface block 2530, a Packet abort signal, trigger to IP extract module, a Packet-over or end-of-packet signal to extraction block and sub-blocks, IHL (IP Header Length) field of IP packet header, a skip packet signal signifying an unknown transport protocol or fragmented packet, a signal that Packet has IP options, an IP option length, IP header processing-done, eight-octets wide formatted data to IP header module, a data-valid pulse, eight-octets wide formatted data for transport header module, a trigger to transport header extraction block, an abort signal to transport extraction module, and a processing-done signal by transport extraction module.

The packet filter in one example operates at the same clock frequency as a receive (RX) interface coupled to an input bus (designated VBUSP) on a three port gigabit switch. Packets arrive in octets (8 bits) at three different effective bit rates of 10/100/1000 Mbps. For a VBUSP bus clock speed of 125 MHz, that corresponds to one VBUSP data word (64 bits) every 800/80/8 clocks for data rate of 10/100/1000 Mbps respectively. A gap interval separates two successive packets. The gap interval measured in number of bit intervals is at least 96 plus the Ethernet preamble size in bits in one system example. That gap interval is equivalent to 160 bit intervals or 16000/1600/160 nanoseconds (ns) or 2000/200/20 clock cycles on the VBUSP bus in 10/100/1000 Mbps modes respectively.

The VBUSP network interface is a 64 bit interface running at 125 MHz, for instance or higher. Each incoming Ethernet In addition to the VBUSP bus signals, the SPF 2500 also outputs the Drop signal in an asserted or de-asserted state. If asserted, the Drop signal is supplied as a pulse.

As described, the extractor module 2570 has a protocol aware state machine(s) that decodes the header field in the current protocol header to determine the encapsulating protocol type and extracts various parameters used for software logging. The header extractor 2570 also provides the respective current offsets to the octets in the packet where Layer 3 and Layer 4 protocol headers start, to a pair of Base registers in block 2770 of the Rule Engine 2520 of FIG. 7. These protocol headers correspond to the location of IP and TCP/UDP/ICMP headers as measured from the beginning of the packet. The rule engine 2520 stalls until the offset values are on hand before executing any instruction that operates on fields in the protocol headers.

Ethernet packets with VLAN, PPPoE, IP, IP Options, and ICMP/TCP/UDP protocol are supported by the extractor. When unknown protocols are detected, the extractor skips any additional packet processing. TABLE 5 lists some examples of packet parsing by the Extractor as it proceeds through some different packets.

TABLE 5

PACKET PARSING EXAMPLES

1. Ethernet - VLAN - PPPoE - IP - IP Options - TCP/UDP/ICMP - Payload
2. Ethernet - VLAN - PPPoE - IP - IP options - Unknown - Payload
3. Ethernet - VLAN - PPPoE - IP - TCP/UDP/ICMP - Payload
4. Ethernet - VLAN - PPPoE - IP - Unknown - Payload
5. Ethernet - VLAN - PPPoE - Fragmented IP - Unknown - Payload
6. Ethernet - VLAN - IP - IP Options - TCP/UDP/ICMP - Payload TABLE 5-continued

PACKET PARSING EXAMPLES

7. Ethernet - VLAN - IP - IP options - Unknown - Payload
8. Ethernet - VLAN - IP - TCP/UDP/ICMP - Payload
9. Ethernet - VLAN - IP - Unknown - Payload
10. Ethernet - VLAN - Fragmented IP - Unknown - Payload
11. Ethernet - IP - IP Options - TCP/UDP/ICMP - Payload
12. Ethernet - IP - IP options - Unknown - Payload
13. Ethernet - IP - TCP/UDP/ICMP - Payload
14. Ethernet - IP - Unknown - Payload
15. Ethernet - Fragmented IP - Unknown - Payload
16. Ethernet - Unknown An example of the flow of an Extractor state machine process is as follows.
1. Wait for start of packet (0x4 on VBUSP address bus along with request and write ready) and proceed to step 2 if start of packet detected.
2. Read Ethernet header Length/Type field (at offset 13). Go to step 3 if next header is VLAN, to step 4 if it is PPP header, to step 5 if it is IP header and to step 8 otherwise.
3. Allow VLAN header to pass and read the Length/Type field. Go to step 4 if next header is PPP, to step 5 if it is IP header and to step 8 otherwise.
4. Read the protocol type in PPP header. Go to step 5 if protocol is IP and to step 8 for unknown protocol.
5. Extract source IP address and destination IP address from the IP header. Determine if the packet has IP options or if the packet is fragmented. Go to step 6 if the packet has IP options and to step 8 if the packet is fragmented. If there are no options and the next protocol header is TCP/UDP, go to step 7. Otherwise, skip processing and go to step 8 because the packet has unrecognized protocol header.
6. Skip IP options and determine the next protocol header. Go to step 7 if next header is TCP/UDP/ICMP. In case the packet contains an IP fragment or if the protocol in the next header is unknown, skip processing and go to step 8.
7. The packet has TCP/UDP/ICMP header. Extract TCP/UDP source and destination port numbers for logging or ICMP type and code fields and go to step 8.
8. Wait for end of frame (0x8/0x10 on VBUSP address) and go to step 1 at end of frame.

In case the packet is aborted (indicated by address 0x10 on VBUSP with request and write ready asserted), the Header State Machine 2565 flushes its current state, goes back to the IDLE state and waits for next packet.

Extractor module 2750 extracts IP protocol, Source IP address, Destination IP address, TCP/UDP source port, TCP/UDP destination port and ICMP type/code from each incoming packet and provides this information to the event logger 2810 for software reporting. In case IP header or TCP/UDP header does not contain the extractable fields then the corresponding field is logged as zero.

In case a packet has an unknown Layer 4 protocol, or an IP packet is fragmented such that the packet does not contain a TCP/UDP/ICMP header, then TCP/UDP source/destination ports or ICMP type/code fields are logged as zeros.

In FIG. 6, the Intrusion Detector block 2520 is implemented as a programmable rule engine including an instruction memory (RAM, random access memory) 2620, decode and program control logic 2630, and an arithmetic/logic unit 2640.

The programmable rule engine is a micro-coded machine that is programmed by the host 2950 software at startup. The instruction memory 2620 is suitably not written with changes by the host 2950, in one example, while the rule engine is processing packets. To modify the contents of instruction memory 2620 (code RAM) during operation, the SPF 2500 is suitably disabled temporarily and the instructions are reloaded. The instruction memory 2620 is made dual-ported to facilitate reloading by host 2950 as well as independent operations in SPF 2500.

The programmable rule engine in block 2520 evaluates various expressions involving the header fields of different protocols to which the incoming packet may belong. These expressions are coded into the instructions that are stored in an internal rule memory RAM 2650 and are used to check whether a packet is mal-formed or is potentially a DoS attack packet. The programmable rule engine executes the instruction for each incoming packet and makes a decision about accepting or rejecting the packet.

Since each packet can have multiple distinct protocol headers, the location of the headers can be different from packet to packet. The rule engine of Intrusion Detector 2520 gets information about the location of the protocol headers from the packet header extractor 2570 as described hereinabove. The packet header extractor 2570 can decode several different protocol types. The octet number at which a particular protocol header is stored is loaded into SPF Base Registers 2770. An application may call for SPF 2500 to filter packets based on protocols that are not decoded by the extractor. In such cases, SPF 2500 bypasses the header extractor 2570 and then the rule engine in block 2520 can be further programmed to analyze such packets and figure out the location of each header.

When SPF 2500 is enabled, and at the start of a packet, the rule engine in block 2520 starts to fetch instructions one at a time. For each instruction, the operands are obtained from either the packet octets that are being received, from internal registers or from the immediate values inside the instruction itself.

A stall feature is included to stall the Rule Engine. For example, if the octet that is needed for execution has not yet been received, then the execution stalls until the octet is received. In case the operand specified in the instruction refers to a packet octet that has already gone by and is not available in the packet buffer, then the execution stalls until the end of packet.

For example, Base+Offset>Size of Packet Buffer 2780 is an instruction decode output that produces a Stall signal. A rule engine instruction is seeking a packet that has not yet arrived, and the Stall is produced. This Stall signal prevents invalid ALU combinational circuit results from being used by program control/drop/data load logic 2660 during each cycle that Stall is asserted. Once all the operands are available, the instruction is executed and logic 2660 uses the results.

Based on the results, the packet is immediately dropped (or not) and/or the result(s) of the evaluated expressions is stored for future use. In addition, a Jump instruction updates a program counter 2710 to point to a particular instruction in the instruction memory 2620 specified by the operation of the Jump instruction.

Programmable Rule Engine 2520 operates on multiple operands and performs multiple tasks in each clock cycle. In each clock cycle, the rule engine 2520 performs one arithmetic and/or logical operation on as many as two pairs of operands in this example. The operands are masked with a 32-bit mask that is generated from the information provided in the instruction. The mask accommodates operations that involve variable-sized operands.

Each operation generates a 32-bit number and a flag bit. The 32-bit number is typically either an arithmetic sum or an output of a bit-wise logical operation. The flag is a single-bit result of a comparison operation. The result of each operation is saved in internal registers block 2720 if a specified condition is satisfied.

In FIG. 7, Internal Registers block 2720 includes registers used by the Rule Engine of block 2520. Registers block 2720 includes temporary 32-bit constant C0-C7 registers, 32-bit R0-R7 registers, 1-bit T0-T3 registers, and rate limit L0-L3 registers.

Depending on the result of a Jump operation, the rule engine 2520 jumps to another location in the instruction memory 2620 specified by program counter 2710 and loads it to a composite instruction register and decode logic 2630 (Instruction Word 2, 1, 0 registers). The program instruction at that location has fields that, depending on the contents of the fields, instruct the rule engine 2520 to either perform a) two save operations or b) two conditional jumps or c) one jump and one save. The conditions for various instances of conditional save and conditional jump are pre-established to be mutually exclusive to prevent unspecified or indeterminate operation. In addition to providing an alternate path for execution, the jump instruction, depending on the jump instruction contents, is used to instruct the rule engine to accept or reject the current packet and exit from the program until the next packet is received.

When the execution of an instruction does not result in a decision to accept or reject the packet, the rule engine 2520 progresses to the next instruction. Instructions are executed until a final decision is made. If a packet is aborted in the middle at the network interface, the rule engine aborts execution and clears all base registers 2770, program counter 2710, Octet Counter, and packet buffer 2780. It is then ready to process next packet.

In FIG. 7, the Programmable Rule Engine 2520 has a set of instructions, as instruction set architecture (ISA). Rule Engine 2520 operates on a suitable size (e.g., 32-instructions-deep) instruction memory 2620 for each incoming packet. This section describes the instruction format and an example of how the Rule Engine 2520 is programmed.

An instruction is supplied to instruction circuit 2630 of FIG. 7. Instruction circuit 2630 has an instruction register coupled to instruction decode logic that feeds control signals on control lines as shown to ALU 2640. Instruction circuit 2630 decode logic further feeds control signals to logic circuitry 2660 for producing a Packet Drop signal for base registers 2770, for loading and controlling the Program Counter 2710, and for loading and controlling internal registers 2720. The instruction decode logic in instruction circuit 2630 also feeds control signals to the packet data extraction logic 2570. Logic circuitry 2660 has a program controller for the Rule Engine coupled to Program Counter 2710. The program controller controls the execution flow.

Logic circuitry 2660 generates the Packet Drop signal based on the ALU 2640 results or counter values or other conditions representing an unacceptable packet. The ALU results and conditions of interest generate values of individual flags, program jump determinations, and jump conditions represented by predetermined logic relationships between multiple flags.

The Packet Drop signal from logic circuitry 2660 is also coupled to the receive FIFO in block 2010 in the Ethernet switch 1910 of FIG. 5. In this way the FIFO is prevented from entering the packet into the FIFO queue of the Ethernet switch 1910.

When the Packet Drop signal is generated, the logic circuitry 2660 also provides an input to the event logger 2810 of FIG. 6, to convey the program counter 2710 value identifying the address of the instruction which dropped the packet. This program counter 2710 value, in effect, identifies attack type directly in an uncomplicated manner. Also logic circuitry 2660 provides an input to event logger 2810 to increment one of the Log Threshold and Count registers corresponding to the attack type, thereby to provide a running count of packets dropped for that attack type. ("Attack" is used as a placeholder for all packet drop types whether or not the SPF is being used to find only malicious packets or simply packets outside the scope of permitted uses or user authorizations regardless of reason.)

The instruction decode logic in instruction circuit 2630 and logic circuitry 2660 is prepared by the skilled worker to effectuate the operations represented by the instruction operation codes and operands and other fields of each instruction in the instruction set as described in detail herein.

Figure 8:
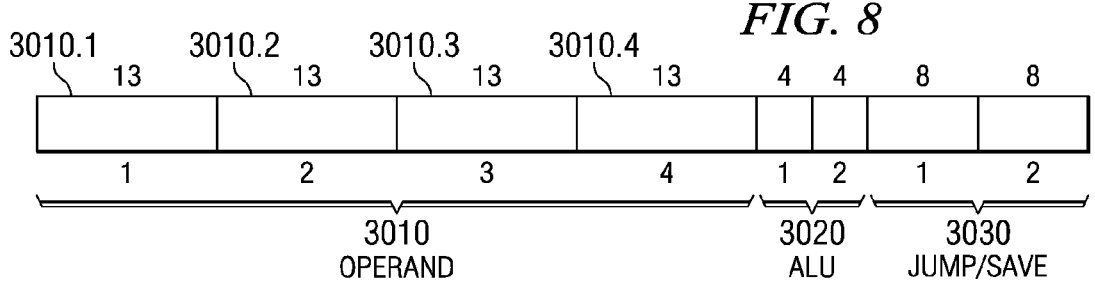
FIG. 8 is a format diagram of an inventive instruction for the inventive packet processor of FIGS. 6 and 7, and wherein inventive instructions are further detailed in FIG. 9 and TABLES 8 and 9.

Instruction Set Description
Instruction Format:

In FIG. 8, each of the instructions is 78-bits wide in this example and is stored in instruction memory 2620 internal to the SPF module 2500. Instruction memory 2620 is suitably implemented as a single-cycle access register file having room for a plurality of instructions (e.g. 32 or 64 in this example).

In FIG. 8, each instruction has a suitable number of fields, such as for example, up to a predetermined number (e.g., four) operands in an Operand Field 3010, used by one or more (e.g., two) arithmetic/logical operations in an ALU field 3020, and one or more (e.g., two) conditional jump/save actions in a Jump/Save field 3030 based on the outcome of the operations coded by a given instruction. TABLE 6 provides further description of the instruction fields.

TABLE 6

INSTRUCTION FORMAT

| Bit Range | Field | Description |
| --- | --- | --- |
| [77:26] | OPERAND | Up to four operands are specified in this field. The source of the operands can be the packet that is being received at the network interface, one of the internal register values or an 8/16/32 bit operand specified within the instruction. |
| [25:22] | FUNCTION0 | This field specifies a single or dual operand Arithmetic/Logic Function. This function is applied to one or both of first two operands specified in the instruction. |
| [21:18] | FUNCTION1 | This field also specifies a single or dual operand Arithmetic/Logic Function. This function is applied to one or both of the third and fourth operands specified in the instruction. |
| [17:9] | OPERATION0 | A Save/Jump/Limit/Nop operation is specified in this function. Save operation code includes the source and destination information. The save source is the output of functions and the destination is one of the internal registers where data should be saved. |

TABLE 6-continued

INSTRUCTION FORMAT

| Bit Range | Field | Description |
|---|---|---|
| | | Jump operation code has information about a condition and a destination. The jump occurs when the condition, which is based on the result of function0 and function1, is true. The Jump destination controls the flow of instruction execution. Jump to location 1 results in the packet being dropped. Rule engine goes back to initial instruction and waits for next packet. The event logger writes information to memory. Jump to location zero results in the packet being accepted. The rule engine goes back to initial instruction and waits for next packet. Limit operation code has information about a condition and a rate limit register. The Limit operation either causes the packet to be dropped or results in the specified rate limit register to be decremented by one. |
| [8:0] | OPERATION1 | This field specifies a second save/jump operation. The format for this field is same as for Operation0. |

Operand Field. The Operand field 3010 of an instruction is 52-bits wide and in this example has up to four operands. The operand field of each instruction is divided into four sub-fields 3010.1-.4 when there is no 16-bit or 32-bit immediate operand or mask encoded in the instruction. Each of these sub-fields has a length one-fourth of the operand field (13 bits), and the format is described in TABLE 6.

The source of the operands is suitably determined by the nature of the instruction and by the contents of fields in the instruction. The source of the operands is suitably A) the packet that is being received at the network interface, B) an 8/16/32 bit immediate operand or C) one of the internal register 2720 values. The operands are input to the two 32-bit ALUs 2792 and 2796 of FIG. 7.

In addition, a bit mask field is associated with each operand. When used, the mask is applied to mask the operand to which the mask pertains. The operand thus masked is input to and used by a 32-bit ALU 2792 or 2796 of FIG. 7. The mask is a 32-bit number generated from a 5-bit code provided as a subfield in the instruction operand field. The 5-bit mask code specifies how many operand bits (counting from the LSB least significant bit side) are input to a respective one of four inputs, i.e., one of two inputs to one of two ALUs 2792 or 2796.

Alternatively, the mask is provided directly from an immediate value in the instruction as shown in some mask subfields in FIG. 9. An immediate mask is used, for instance, when the mask is not a continuous series of ones (1's). When an immediate mask value is specified, the mask value specified by the (Bits subfield) is ignored.

When the operand value to be processed is one of the internal register 2720 values, the register is identified by a code in the operand field of the instruction.

In FIG. 8, the operand field 3010 specifies up to four 13-bit operands 3010.1, .2, .3, .4. Each operand is obtained from the incoming packet data, from an internal register or as an immediate value specified in the instruction itself. Muxes 2782, 2784, 2786, 2788 of FIG. 7 obtain the operands. In addition, there is a bit mask associated with each operand. The mask values are encoded in the instruction itself and the mask for each operand is applied before it is used by the Arithmetic and Logic Unit. Lines from instruction circuitry 2630 to each Mux control the selection and apply the mask by combinational logic inside each Mux.

Packet Data Operand. {Base [2:0], Offset [4:0], Bits [4:0]} This type of operand is derived from the packet itself. The Bits [4:0] encoding specifies a number of bits (up to 32) to be extracted from a location in the packet indicated by the selected Base register and Offset. Internally, a 32-bit number is obtained from the packet data instruction logic 2570. Then a mask is created from the Bits[4:0] field and bitwise ANDed with the 32-bits extracted from the packet.

The Base [2:0] field selects one of the Base registers B0, B1, B2, B3 or B4. The operand has (Bits+1) number of bits extracted from the packet. In the packet, the location where the operand octets are extracted is determined by the sum of the value in the specified base register (B1-B4) and the specified value in Offset [4:0]. Base 0 is start of packet.

The number of bits to be used as operand is specified by Bits+1. When Bits[4:0] is zero, only one bit is used as operand. When Bits[4:0] is 31, then 32 bits are used as operand.

Constant Operand: {10100, C[2:0], Bits [4:0]} One of the eight constants programmed by the host software into respective registers C0-C7 is an available operand. The Bits [4:0] field specifies the mask to be applied to the selected 32-bit constant. The C[2:0] field selects one of the constants.

32-bit Register Operand: {10101, R[2:0], Bits [4:0]} One of eight 32-bit registers R0-R7 is used as operand and bits[4:0] field specifies the bit mask to be applied to that register. The R[2:0] field selects one of the 32-bits registers (R0-R7).

1-bit Register Operand: {101100, T[1:0], 00000} One of the four 1-bit registers is used as operand. The T{1:0] field selects one of the four 1-bits registers (T0-T3).

Base Register Operand: {101111, B[1:0], 00, Bits[2:0]} The B[1:0] field selects one of the four base registers (B1-B4). Note that B0 is a virtual register which is zero and specifies the start of packet.

End of Packet Operand: {10110110, Bits[4:0]}. The End-of-Packet (EOP) operand is used to detect the end of current packet. Use of this operand stalls the CPU until the end of packet is reached. The end of packet operand is equal to one (1) when the CPU detects end of packet. The EOP operand is zero until packet data is being received and also stalls the CPU. The EOP operand is suitably used, for instance, in the last instruction to check for size of current packet. Note that this operand tracks the end of a complete successfully received packet by the RFIFO. The EOP operand does not necessarily detect abort of a packet. The Bits[4:0] number of bits specifies the mask. However, these bits are inconsequential for EOP operand. Irrespective of the mask specified by bits[4:0], the EOP operand is always equal to 0x1 in the execution cycle of the instruction it is used in.

Octet Count Operand: {10110111, Bits[4:0]} The Octet count operand is used to determine the number of bytes that have been received by rule engine. The Bits[4:0] number of bits specifies the mask that is applied to Octet Counter value. A useful value for this field is 0x1F.

Immediate Data Operands. The immediate data operands are also bigger than 13 bits as shown in some of the codes below. Each of such operands is directly sent to the ALU without applying any additional bit mask. The immediate data operands can be 8, 16 or 32 bits wide in this example:
8 bit Immediate: {11100, Data[7:0]}
16 bit Immediate: {11101, Data[15:0]}
32 bit Immediate: {11110, Data[31:0]}

Immediate Operand Masks. The operand fields can also be used to specify bit masks. These are used when specific bits from an operand are to be extracted. 8-bit and 16-bit masks are available for encoding into the operand field of an instruction:
8 bit Mask: {11000, Mask[7:0]}
16 bit Mask: {11001, Mask[15:0]}

Various operand and mask types are summarized in the following TABLES 7A, 7B and illustrated in FIG. 9.

In FIG. 9, the operand field of each instruction is divided as with format 3110 into four sub-fields when there is no 16-bit or 32 bit immediate operand or mask encoded in the instruction. Most of these sub-fields use a 13-bit code and the format of the 13-bit code is described in TABLE 7A. TABLE 7B summarizes the longer codes.

TABLE 7A

| PKT/REG OPERAND SUB-FORMAT | | | | | |
|---|---|---|---|---|---|
| | Operand Code | | | Description | |
| B[2:0] | Offset[4:0] | Bits{4:0} | | Operand | Mask |
| 000 | Offset | Bits | | The operand comprises of (Bits + 1) bits extracted from the packet. The offset from where the operand octets are extracted is determined by the sum of the value of specified base register (Base 0 to Base 4) and the specified offset. Base 0 is start of packet. | $2^{(Bits + 1)} - 1$ |
| 001 | (0-31) | (0-31) | | | |
| 010 | | | | | |
| 011 | | | | | |
| 100 | | | | | |
| 1 0 1 0 0 | | C0-C7 | Bits (0-31) | One of the Constants registers is used as operand. These constants are set by the host software. | $2^{(Bits + 1)} - 1$ |
| 1 0 1 0 1 | | R0-R7 | Bits (0-31) | One of the internal 32-bit working registers R0-R7 is used as operand. | $2^{(Bits + 1)} - 1$ |
| 1 0 1 1 0 0 | | T0-T3 | 00000 | One of the internal 1-bit Registers is used. | 0x00000001 |
| 1 0 1 1 0 1 1 0 | | | 00000 | EOP signal is used as operand. Execution stalls until end-of-packet/abort occurs. | 0x00000001 |
| 1 0 1 1 0 1 1 1 | | | Bits (0-31) | Octet Count Register is used as operand. | $2^{(Bits + 1)} - 1$ |
| 1 0 1 1 1 0 | | L0-L3 | | One of the Rate Limit registers is used. The two-bit codes are 00, 01, 10, and 11 for L0 to L3 respectively. | $2^{(Bits + 1)} - 1$ |
| 1 0 1 1 1 1 | | B1-B4 | Bits (0-31) | One of the Base registers is used. The two-bit codes are 00, 01, 10 and 11 for B1 to B4 respectively | $2^{(Bits + 1)} - 1$ |

TABLE 7B shows further opcodes for the instruction set of the rule engine 2520. Numerous embodiments of a programmable rule engine are contemplated, as well as hardware-only embodiments.

TABLE 7B

| MASK AND IMMEDIATE SUB-FORMATS | |
|---|---|
| CODE | |
| 3bits | 2bit|Mask/Imm bits |
| 110 | 00|8/8-bit Mask |

TABLE 7B-continued

| MASK AND IMMEDIATE SUB-FORMATS | |
|---|---|
| CODE | |
| 110 | 01|xx. Use 16-bit Mask |
| 3bits | 2bit| |
| 111 | 00|8 bits of 8-bit Immediate |
| 111 | 01|xx. Use 16-bit Immediate |
| 111 | 10|xx. Use 32-bit Immediate |
| 111 | 11|No Operand ("Blank") |

In some embodiments, two or more packets occupy space in the Packet Data circuit block and SPF circuitry keeps track of multiple packets. Without limitation, an example embodiment discussed in more detail here is simplified to only work on one packet at a time. Packets from multiple buses are handled by multiple SPFs or by multiplexing as in FIGS. 4-5.

Packet Buffer 2780 includes a real-estate efficient 8-octet×4 deep packet FIFO that holds a snapshot of up to the last 32 octets of a current packet. This buffer 2780 allows evaluation of expressions on packet octets even after the packet octets have passed by and gone on the external receive VBUSP network interface. The contents of packet buffer 2780 are invalidated as soon as the current packet ends. When a next packet arrives, the packet buffer 2780 starts to fill from the beginning of the new packet.

At the start of packet, the first eight octets received are loaded into the first eight locations of the packet buffer 2780. When the next eight octets arrive, these are loaded into the first eight locations and the existing eight octets are moved to the following eight locations in the FIFO structure of buffer 2780. This process is continued until the packet buffer 2780 is full. When packet buffer 2780 is full and additional octets arrive, the oldest eight octets are shifted out or overwritten and are no longer available to the rule engine. In this way, the packet buffer provides a snapshot of most recent octets received.

When the rule engine encounters instructions that reference packet octets which have not yet been received, then the rule engine stalls until the required octets are available. Similarly, instructions which require octets that have already been shifted out of the packet buffer cause rule engine to stall. And since these octets are gone, the rule engine does not execute any further instructions for the current packet. The rule engine instead returns to the first instruction for processing a new packet.

The contents of a packet, when used as one or more operands in an instruction, are fetched from the packet buffer 2780. The Base registers (B1-B4) in conjunction with an Offset value and Mask are used to specify which octets are to be used as operands by the Rule Engine.

The entries in the base registers B1, B2, B3, B4 are interpreted in terms of octets in this example. The base registers indicate, in octet count, the location of a particular protocol header. For example, the base registers hold protocol header locations respective to IP, TCP, ICMP and UDP protocol, or some other set of protocols selected by the skilled worker.

The extractor module 2510 circuitry determines or calculates the entry to put in each base register B1-B4 as follows. The extractor module 2510 has HSM 2565 and other state machines as described elsewhere herein that are implemented to detect and respond to selected packet protocols such as IP, TCP, ICMP and UDP for instance. The protocols conform to available standards documentation that defines the size and location of the headers of each such protocol.

The extractor module 2510 scans the packet as it is coming in and the appropriate state machine(s) determines the protocol(s) and responsively loads appropriate standards-based starting octet position value for each header in the packet into its corresponding protocol-specific Base register. For example, extractor module 2510 receives a packet and a state machine determines it is an Ethernet packet and determines whether the Ethernet header is 14 or 18 bytes long from a header length field. Then extractor module 2510 circuitry scans the incoming Ethernet header itself. If that Ethernet header includes an IP version 4 header, the circuitry loads into IP-protocol-specific base register B1 a value 14 or 18 whichever was determined.

Since the IP Header follows the Ethernet header, that value in Base register B1 signifies the location of the beginning of the IP header. Then extractor module 2510 IP Header Extraction State Machine analogously loads Base register B2 based on the IP Header length specified in the IP header and awaits the end of the IP header. At the end of the IP header begins a TCP/ICMP/UDP header which is scanned too. Any of the headers can be checked for defects indicative of an attack.

The multiple base registers B1-B4 usefully record the starting byte or octet of each header by its particular protocol. Starting with a given Base Register value and coded Offset, any bit or set of bits can be located and read at octet positions up to 32 octets (or applicable packet buffer size) beyond the Base Register value in the example 32-octet Packet Buffer 2780. For instance, Base Register B1 suitably holds the address of an IP header. Base Register B2 is made to hold the address of a TCP header. SPF 2500 uses two base registers for most packets. Additional Base Registers B3, B4 beyond the first two Base Registers are provided to support software in instruction memory 2620 to probe packets based on other protocols such as PPP, FTP (file transfer protocol), etc. In this embodiment, the base register B0 is non-existent in the hardware, but the circuitry responded to its register code with a base value of zero, meaning start of packet.

The RV bus snooper 2560 circuitry includes an Octet Counter that keeps a running count of octets in the packet that have arrived. The Octet Counter identifies the last octet available from the packet. Then the extractor logic 2570 generates or assigns a temporary location index value equal to the octet count minus the sum of an identified Base register plus the coded Offset value. The Base register and Offset value (in octets) are identified in the rule engine instruction at hand (see Table 7A). The location index value accesses the desired location in packet buffer 2780.

An instruction to the rule engine is used to gain access to the Source Address field of a IP header. The Offset value from the start of the IP header is coded 16, from the IP standards documentation. Since the header of the IP protocol is desired, the base register to use in the instruction is B1 (001, for IP protocol), Offset is coded 16 and Mask Bits field is coded 31 (implying 31+1 bit operand). This information is decoded or translated to an index into the packet buffer 2780 hardware by instruction circuitry 2630, packet data extraction logic 2570 or logic in packet buffer 2780.

The packet buffer 2780 has a limited space for octets (e.g., 32 bytes) corresponding to a finite window on the packet. So, the last (oldest) octet that is in the packet buffer is determined and, based on that, 4 bytes are picked up from the contents of the packet buffer 2780. If the Offset into packet buffer 2780 is larger than the packet buffer size, then the circuitry generates a Stall signal. In response to the Stall signal, the Rule Engine 2520 stalls and waits for the octets to arrive. When the octets arrive, the Rule Engine 2520 executes a given Instruction from block 2630 of FIG. 7. By contrast, if the octets corresponding to the offset are already gone, then various embodiments of structure and process provide one or more of the following: 1) the SPF 2500 waits until the eventual end of packet and then returns to the first instruction to start on another packet, 2) a programming error signal is generated, and 3) the instruction programmer or compiler software prevents the condition in the first place.

In TABLE 7A, description now turns to the Bits# mask entry. The Bits# entry identifies a code number used to generate a series of ones by an automatic mask to extract bits from a register, or to extract bits from Packet Buffer 2780 starting at the beginning of the packet octet identified by Base value plus Offset.

The mask operand is comprised of (Bits#+1) number of ones (1's) to extract the same number of bits from the packet. The number of ones in the mask is equal to the number of ones and their positions in the binary number representing $2^{(Bits\#+1)}-1$. For example, if the number in the Bits# field is 00000 (binary zero, decimal zero), the number represented by an LSB string of ones in the 32-bit mask is a single "one" (0x01). If the number in the Bits# field is 01101 binary (decimal 13), the number of LSB ones in the mask is fourteen (0x01111111111111), which is the number of ones in the binary number $2^{(13+1)}-1$. If the number in the Bits# field is 11111 binary (decimal 31), the number of bits in the mask is 32. The mask operates such that bits from the packet at each position where the mask is one (1) are passed through as an operand, and bits from the packet from each bit position where the mask is zero are ignored and effectively replaced with zeroes.

For example, the Source Port field is obtained from a TCP header, by coding "01111" into the 5-bits Bits# field of an instruction to introduce actual mask bits of 0000FFFF hexadecimal. This works because applying the $(2^{(Bits\#+1)})-1$ automatic mask from TABLE 7A on Bits# "01111" produces $(2^{(15+1)})-1$ which equals 0000FFFF hex, i.e. a series of sixteen binary one bits.

A Mask involving a window other than a right-justified series of ones is directly entered in an immediate Mask field without using the Bits# field. For instance, to check the SYN flag in the TCP flags field, Base Register B2 holds a value representing the position in the IP packet of the starting octet in the TCP header. Using knowledge of TCP protocol documentation, the SYN flag octet location is coded as a position displaced from the starting octet in the TCP header by an Offset of 12 bytes (Offset=12). The starting octet (first byte of TCP header) has Offset of zero. To recover the SYN flag, an 8-bit immediate Mask is applied to the octet that includes the SYN flag in the packet.

To recover the SYN flag, the immediate Mask is applied to the octet that includes the SYN flag. The immediate Mask to apply is "00000010" the "1" in that binary mask occupies the position where the SYN flag lies.

An immediate Mask operates to pass through packet bits where the mask bits are one, and then puts in zeroes in the operand otherwise. Accordingly, executing an instruction with this Mask provides the instruction with an operand value comprised of all zeroes, except for just a single bit that could be a one if SYN flag is set, otherwise that single bit is zero also. A compare-with-zero operation in the FIG. 8 ALU0 field, say, is then suitably used to check if SYN was actually set or not. A Flag0 resulting value from the ALU0 compare then provides or contributes to the logic of a Jump Condition defined in the same instruction of FIG. 8, for example.

Masks are applied to operands from any source such as registers 2720 and from packet buffer 2780. Masks are not applied to immediate data types in this embodiment although other embodiments can use such approach. From a hardware perspective, the rule engine contains a buffer 2780 to store packet octets, several internal registers 2720 for temporary storage, instruction decoding logic 2630 and control circuitry 2660. The rule engine instructions refer to the internal registers and packet octets during execution.

Base Registers (B0-B4): Four hardware base registers (B1-B4) store the location of various protocol-specific headers. The B0 register is not a hardware register and it signifies a reference to the first octet in a packet itself. Each base register B1-B4 is eight bits wide and is used to reference octets in a packet. The base registers can point to any octet in the packet up to 255 octets. These registers are readable and writable by the rule engine. In addition, base registers B1 and B2 are loaded with data provided by the extractor when the rule engine is not running in Extractor Bypass mode (Extractor Bypass bit=0 in Control Register). The rule engine can write to base registers irrespective of whether extractor bypass is enabled. When an operand needs to use contents of B1-B4 base registers, the instruction only executes if the specified base register was loaded at least once after the beginning of current packet. If the specified base register was not loaded during the current packet, then the operand referenced by this base register cannot be extracted from the packet and will cause the rule engine to stall and wait for the next packet.

Constant Registers (C0-C7): The rule engine can refer to any of eight 32-bit constant values. These are programmed by the host 2950 and the rule engine in this embodiment has read-only access to these registers. For a given rule engine instruction operand having opcode "10100" in TABLE 7A, a three-bit code is entered in the bit positions "C0-C7" to identify one of the eight Constant Registers. The data value in the identified one Constant Register is used executing the arithmetic and/or logic of the instruction.

For example, the Constant register(s) are used by SPF 2500 in one example, to accomplish packet tests by loading the Constant Registers with IP addresses. The given IP addresses are compared to see if they match the Source IP Address field in a header of each packet as packets arrive. These IP addresses are used as a list of "friendly" IP addresses from which packets are accepted subject to other packet tests, while packets from other all other IP addresses are blocked. Another use loads the Constant Registers with a list of "unfriendly" IP addresses from which to block packets regardless of whether they would pass other tests. The instruction memory 2620 is loaded with instructions suitably programmed to effectuate the foregoing uses and still other uses. Because the constant values are readily loaded into the memory-mapped Constant Registers without changing the program in instruction memory 2620, a degree of additional flexibility is provided compared to changing SPF 2500 firmware or software.

A set of Internal Registers R0-R7 are provided to hold working register values. These eight 32-bit registers are read/write accessible by the rule engine as general purpose registers and for temporary storage. In addition, when the rule engine is required to provide logging information, R4-R7 are used to store information that is to be written to memory. For a given instruction operand having opcode "10101" in TABLE 7A, a three bit code is entered in the bit positions "R0-R7" to identify one of the eight Internal Registers. The data value in the identified one Internal Register is used as an operand value in executing the instruction.

A set of General Purpose One-Bit Registers T0-T3 are provided to hold one-bit register values as described in the description of the Save/Jump features 3030 of FIG. 8. For a given instruction operand having opcode "101100" in TABLE 7A, a two bit code is entered in the bit positions "T0-T3" to identify one of the four 1-bit T Registers. The value in the identified one 1-bit register is used as an operand value in executing the instruction. These four 1-bit registers T0-T3 are used by the rule engine in block 2520 to store comparison results. These registers T0-T3 can be used to store 1-bit output from ALUs. In addition, the logical OR and logical AND of the flags can also be stored in T0-T3 registers. The 32-bit ALU 2792 and 2796 LSB (least significant bit) results can also be stored in T0-T3 registers.

A clock pre-scaler Rate Limit Pre-Scale Register configures a clock divider that drives a Pre-Scale Counter. Every count down to zero of Pre-Scale Counter and the subsequent roll-over indicates the end of a pre-scale time interval.

A set of Rate Limit Registers L0-L3 are provided to hold rate limit register values programmed by host processor 2950. For a given instruction operand having opcode "101110" in TABLE 7A, a two-bit code is entered in the bit positions "L0-L3" to identify one of the four Rate Limit Registers and their corresponding Rate Limit Down Counters. The value in the identified one Rate Limit Down Counter is used as an operand value in executing the instruction. These four 8-bit rate limit registers are used by the rule engine in block 2520 to initialize Down-counts of specific types of packets that are to be rate limited. These registers L0-L3 are used to periodically load their corresponding Down-counters with programmed threshold values at the end of each time interval determined by the clock pre-scaler Rate Limit Pre-Scale register. At every Pre-Scale Counter rollover event, each of the Rate Limit Down Counters is loaded with a preset value from a respective one of the four rate limit registers L0-L3. When packets are received, the rule engine 2520 identifies packets of particular types and executes a rate limit operation. The limit operation specifies a condition and a rate limit register. If the condition evaluates to true, the packet is dropped if the applicable Rate Limit Down Counter has reached zero. If the Rate Limit Down-counter is non-zero, then the Rate Limit Down Counter is decremented by one.

Thus, by using the clock pre-scaler and the rate limit registers L0-L3, the rule engine 2520 controls the rate of specific types of packets. By controlling the value of pre-scale counter (common to the rate limit registers) and the rate limit thresholds, the granularity of the rate is modified. A lower value of pre-scale counter is likely to cause frequent reloads of the rate limit registers L0-L3 and allows rate control over small time intervals. Keeping the pre-scale counter at extremely small values may cause the rate limiter to be ineffective because the limit registers L0-L3 are reloaded too frequently to count down to zero. Conversely, a higher value of pre-scale counter causes less frequent reloads of the rate limit registers L0-L3 and the rate control occurs over longer time intervals. The reload value of each 8-bit rate limit register L0-L3 and the pre-scale register are programmed by the host processor 2950 before SPF 2500 is enabled. A reload value of 0xFF is used to disable any of the rate limiters at run-time without changing the firmware. Both the Rate Limit Pre-scale Register and Rate Limit L0-L3 registers are modifiable during run-time.

In FIG. 7, Instruction block 2630 includes an operand decoder sub-block for each ALU field 3020 and Jump Save Field 3030 in FIG. 8. Instruction block 2630 also parses and decodes each Operand field 3010.1, .2, .3, .4 to obtain operands for the ALU operations defined by the ALU field 3020. These operands are obtained from packet buffer 2780 and registers 2770 and 2720 according to TABLE 7A and FIG. 9. In FIG. 9, when an immediate Operand or an immediate Mask is specified within the instruction, as shown in the alternative formats 3115-3170 of FIG. 9 and TABLE 7B, the operand field is decoded respective to the opcodes and immediate operand or Mask subfields in each of those alternative formats 3115-3170.

FIG. 9 shows various combinations of sub-formats in which operands are suitably programmed. Different ones of the sub-formats are called Pkt/Reg Operand, Mask and Immediate. The sub-formats are used to establish each one of the up-to-four operands that go to ALU circuitry 2640 of FIG. 7 in this embodiment.

Each sub-format designated Pkt/Reg Operand, here shown as 13-bit Pkt/Reg Operand[12:0], is an operand delivering data from the incoming packet or, alternatively, contents of one of the internal registers. A Pkt/Reg Operand has leading code bits from TABLE 7A. In FIG. 9, all the formats 3110-3170 have a Pkt/Reg Operand sub-format as the leftmost entry.

The sub-format Mask specifies a value that is used as an immediate Mask instead of the automatic mask generated from a Bits field in the Pkt/Reg Operand. Opcode "110" entries like 3105.8 and 3105.16 having five bits from TABLE 7B identify this Mask sub-format for respective 8-bit mask and 16-bit mask fields. In effect, the Mask sub-format opcode "110" entries prevent the instruction decoder in block 2630 from interpreting the succeeding bits as a Pkt/Reg Operand sub-format and likewise prevent interpretation as an Immediate sub-format. Instead, the instruction decoder responds to the appropriate number of succeeding bits as an immediate Mask.

Sub-format Immediate operand, such as Immediate[7:0], Immediate [15:0], and Immediate[31:0], identify a respective 8-bit, 16-bit, or 32-bit number that is used as an operand. Opcode leading "111" entries like 3107.8, 3107.16 and 3107.32 having five bits identify this Immediate sub-format for respective 8-bit, 16-bit, and 32-bit immediate fields. In effect, the Immediate sub-format leading code "111" entries prevent the decoder from interpreting the succeeding bits as a Pkt/Reg Operand sub-format and likewise prevent interpretation as a Mask sub-format. For instance, a code 11100 means that the following 8 bits establish one immediate operand to go to the ALU 2640. The alternative codes 11101 and 11110 respectively mean that the following 16 bits or 32 bits establish one immediate operand to go to the ALU 2640. Note that "11111" identifies a blank format that delivers zero to the ALU 2640.

FIG. 9 and TABLE 8 list some combinations in which operands are coded in bit range [77:26] in an instruction. Pkt/Reg operand is an operand specifying octets from the packet or the contents of one of the internal registers; mask specifies an immediate Mask instead of the automatic mask generated from the Bits field in the instruction; immediate operand (immediate[7:0], immediate[15:0] and immediate [31:0]) is an 8/16/32 bit number that is used as an operand. In the operand TABLE 8 below all entries PKT/Reg/1 mm [7:0] and Pkt/Reg comprise 13 bits each. Groups of five ones (11111) in the lists are ignored filler bits. Semicolons conceptually separate operands in TABLE 8.

The decoding of operands for each ALU is dependent upon the type of operation specified in the ALU and the format of the operand field. When there are four operands in the operand field, the first and second operands are used in ALU0 2792 and the rest by ALU1 2796. When ALU0 needs only one operand, then the remaining operands are fed to ALU1. The order of decoding operands is designed to first provide operands to ALU0 from the more-significant-bit (MSB) bit side of the operand field and then to ALU1.

The number of operands specified in instruction is coded to match with the number of operands required by the ALUs. The rule engine stalls until data is available. During the stall phase, the instruction is decoded every cycle until all required operands are available simultaneously for the instruction to be executed. In addition, if an instruction refers to packet octets that are no longer available, the rule engine stalls until the end of packet.

TABLE 8

OPERAND FIELDS

Operand Field with Four Operands (13 Bits Each)

{Pkt/Reg/Imm[7:0]; Pkt/Reg/Imm[7:0]; Pkt/Reg/Imm[7:0]; Pkt/Reg/Imm[7:0]}
Operand Field with Three Operands {Pkt/Reg/Imm[7:0]; Pkt/Reg/Imm[7:0]; Pkt/Reg/Imm[7:0]; Reserved}
{Pkt/Reg,11000 Mask[7:0]; Pkt/Reg/Imm[7:0]; Pkt/Reg/Imm[7:0]}
{Pkt/Reg/Imm[7:0]; Pkt/Reg 11000 Mask[7:0]; Pkt/Reg/Imm[7:0]}
{Pkt/Reg/Imm[7:0]; Pkt/Reg/Imm[7:0]; Pkt/Reg 11000 Mask[7:0]}
{11101 Immediate[15:0] 11111; Pkt/Reg/Imm[7:0]; Pkt/Reg/Imm[7:0]}
{Pkt/Reg/Imm[7:0]; 11101 Immediate[15:0] 11111; Pkt/Reg/Imm[7:0]}
{Pkt/Reg/Imm[7:0]; Pkt/Reg/Imm[7:0]; 11101 Immediate[15:0] 11111}
Operand Field with Two Operands {Pkt/Reg/Imm[7:0]; Pkt/Reg/Imm[7:0]; Reserved Reserved}
{Pkt/Reg/Imm[7:0]; Pkt/Reg 11000 Mask[7:0]; Reserved}
{Pkt/Reg 11000 Mask[7:0]; Pkt/Reg/Imm[7:0] Reserved}
{Pkt/Reg 11000 Mask[7:0]; Pkt/Reg 11000 Mask [7:0]}
{11101 Immediate[15:0] 11111; Pkt/Reg 11000 Mask [7:0]}
{Pkt/Reg/Imm[7:0]; 11101 Immediate[15:0]; 11111 Reserved}
{Pkt/Reg 11000 Mask[7:0]; 11101 Immediate[15:0] 11111}
{11101 Immediate[15:0] 11111; 11101 Immediate[15:0] 11111}
{11101 Immediate[15:0] 11111; Pkt/Reg/Imm[7:0]; Reserved}
{Pkt/Reg 11001 Mask[15:0] 11111; Pkt/Reg/Imm[7:0]}
{Pkt/Reg/Imm[7:0]; Pkt/Reg 11001 Mask[15:0] 11111}
{Pkt/Reg 11001 Mask[15:0]; 01 Immediate [15:0]}
{Pkt/Reg/Imm[7:0]; 11110 Immediate[31:0] 11}
{11110 Immediate[31:0] 11; Pkt/Reg/Imm[7:0]}
Operand Field with One Operand {Pkt/Reg/Imm[7:0]; Reserved Reserved Reserved}
{Pkt/Reg 11000 Mask[7:0]; Reserved Reserved}
{Pkt/Reg 11001 Mask[15:0]; 11111 Reserved}
{11101 Immediate [15:0]; 11111 Reserved Reserved}
{11110 Immediate [31:0]; 11 Reserved}

The formats in which operands are specified in the operand field, in one example are arranged so that A) a mask does not follow an immediate value, B) a mask does not follow a previous mask, C) a reserved field has all following fields reserved as well, and D) the first field is not a mask.

TABLE 9 shows some examples of the operand field encoding. Each example identifies a format followed by the example binary codes and a legend. An immediate Mask (explicit mask bit-field) takes precedence over a narrower automatic Mask. Immediate operands are shown in hexadecimal, and lower case and upper case hexadecimal letters are used to distinguish masks from immediates respectively, but otherwise the lower/upper case does not affect the indicated hexadecimal value. Semicolons conceptually separate the individual operands. Commas conceptually separate Base, Offset, and Mask Bits#subfields. "x" represents a series of filler zeroes.

TABLE 9

OPERAND FIELD ENCODING EXAMPLES

Example 1

{Pkt/Reg/Imm[7:0]; Pkt/Reg/Imm[7:0]; Pkt/Reg/Imm[7:0]; Pkt/Reg/Imm[7:0]}
{001,00001,01111; 000,00010,01111; 000,001,10111; 001,00101,10011}
{pkt[b1+0][b1+1] & 0xffff; pkt[b0+1][b0+2] & 0xffff; pkt[b0+2][b0+4] & 0xffffff; pkt[b1+3][b1+5] & 0xfffff}
{10101,001,01111; 10101,010,01111; 000,00100,10111; 10100,101,10011}
{R1 & 0xffff; R2 & 0xffff; pkt[b0+2][b0+4] & 0xffffff; C5 & 0xfffff}
{001,00001,01111; 11100,01001111; 000,00100,10111; 11100,10110011}
{pkt[b1+0][b1+1]&0xffff; imm:0x4F; pkt[b0+2][b0+4] & 0xffffff; imm:0xB3}
Example 2

{Pkt/Reg 11000 Mask[7:0]; Pkt/Reg/Imm[7:0]; Pkt/Reg/Imm[7:0]}
{001,00001,01111,11000,01101111; 000,00100,10111; 001,00101,10011}
{pkt[b1+0][b1+1] & 0x6F; pkt[b0+2][b0+4] & 0xffffff; pkt[b1+3][b1+5] & 0xfffff}
Example 3

{Pkt/Reg 11000 Mask[7:0]; Pkt/Reg 11000 Mask [7:0]}
{001,00101,01111,11000,01101011; 000,00100,10111,11000,10110011}
{pkt[b1+4][b1+5] & 0x6B; pkt[b0+2][b0+4] & 0xB3}
Example 4

{Pkt/Reg 11000 Mask[7:0]; Pkt/Reg/Imm[7:0]; Pkt/Reg/Imm[7:0]}
{001,00101,01111,11000,01101011; 11100,10010111; 001,00101,10011}
{pkt[b1+4][b1+5] & 0x6B; imm:0x97; pkt[b1+3][b1+5] & 0xfffff}
Example 5

{Pkt/Reg, 11000 Mask[7:0]; Pkt/Reg/Imm[7:0]; Reserved}
{001,00101,01111,11000,01101011; 000,00100,10111; 1111111111111}
{pkt[b1+4][b1+5] & 0x6B; pkt[b0+2][b0+4] & 0xffffff; No operand}
Example 6

{Pkt/Reg 11000 Mask[7:0]; Pkt/Reg/Imm[7:0]; Reserved}
{001,00101,01111,11000,01101011; 11100,10100111; 1111111111111}
{pkt[b1+4][b1+5] & 0x6B; imm: 0x0A7; No operand}
Example 7

{Pkt/Reg/Imm[7:0]; Pkt/Reg/Imm[7:0]; Reserved Reserved}
{001,00001,01111; 000,00100,10111; 1111111111111; 1111111111111}
{pkt[b1+0][b1+1]&0xffff; pkt[b0+2][b0+4] & 0xffffff; No Operand; No Operand}
Example 8

{Pkt/Reg 11001 Mask[15:0]; 01 Immediate [15:0]}
{001,00001,01111,11001,0100111100000111; 01,0000010010110011}
{pkt[b1+0][b1+1] & 0x4f07; imm: 0x04B3}
Example 9

{Pkt/Reg 11001 Mask[15:0]; 11111 Pkt/Reg/Imm[7:0]}
{001,00001,01111,11001,0100111100000111; 11111,001,00101,10011}

TABLE 9-continued

OPERAND FIELD ENCODING EXAMPLES

{pkt[b1+0][b1+1] & 0x4f07; pkt[b1+3][b1+5] & 0xfffff}
Example 10

{Pkt/Reg 11001 Mask[15:0]; 11111 Reserved}
{001,00001,01111,11001,0100111100000111; 1111111111111111}
{pkt[b1+0][b1+1] & 0x4f07; No Operand}
Example 11

{Pkt/Reg/Imm[7:0]; 11101 Immediate[15:0]; 11111 Reserved}
{001,00001,01111,11101,0100111100000111; 1111111111111111}
{pkt[b1+0][b1+1]& 0x4f07; No Operand}
Example 12

{Pkt/Reg/Imm[7:0]; 11110 Immediate[31:0]; 11}
{001,00001,11110; 11110,0100111100000111101010011000110;11}
{pkt[b1+0][b1+1]&0x7fffffff; imm: 0x4F07A986}

In FIG. 9, format 3110 shows four 13-bit Pkt/Reg Operand sub-fields each independently coded according to TABLE 7A and selectively providing pairs of operands for, and steering them to, one or more ALU0 and ALU1 inputs of FIG. 7 in the order of the subfields of FIG. 9.

Format 3115 shows the first, third, and fourth 13-bit Pkt/Reg Operand sub-fields each independently coded according to TABLE 7A. The second sub-field however, is occupied with a TABLE 7B code in its MSB five bits calling for 8-bit mask and then the actual 8-bit mask in its LSB eight bits. ALU0 input of FIG. 7 receives an operand based on the first and second operand subfields of FIG. 9. ALU0 second input receives an operand based on the third subfield. ALU1 receives a single operand based on the fourth subfield.

Format 3120 shows the first and third 13-bit Pkt/Reg Operand sub-fields each independently coded according to TABLE 7A. The second and fourth sub-fields however, are each coded with a TABLE 7B mask code and occupied in their LSB eight bits with respective 8-bit masks for the instructions in the first and third sub-fields. The second and fourth sub-fields respectively complete for those first and third subfields the information in the row of TABLE 7B coded for 8 bit mask. ALU0 receives a pair of operands based on Format 3120. ALU1 receives no operands.

Format 3125 shows the first and fourth 13-bit Pkt/Reg Operand sub-fields each independently coded according to TABLE 7A. The second sub-field bits are coded with a TABLE 7B code for 8-bit mask for use with the operand in the first sub-field. The third sub-field is coded with a TABLE 7B code for 8-bit Immediate to provide another operand to ALU0 for use with the operand obtained from the first sub-field. The fourth subfield is coded with a Pkt/Reg operand with automatic mask for a single-operand ALU1 operation.

Format 3130 is similar to format 3115 except that format 3130 lacks an operand in the fourth sub-field. The blank means there is no operand. Each "blank" operand field includes a distinct 5-bit format specifier code (e.g., 11111 at bottom of TABLE 7A) to represent the absence of an operand. Blank operand fields are shown as dash entries in formats 3130, 3135, 3140, 3160 and 3165 of FIG. 9. ALU0 receives a pair of operands, and ALU1 receives no operand.

Format 3135 includes both a Mask field and Immediate field following the 13-bit Pkt/Reg Operand. Format 3135 is similar to format 3125 except that format 3135 lacks an operand in the fourth sub-field. ALU0 receives a pair of operands, and ALU1 receives no operand.

Format 3140 is similar to format 3110 except that format 3140 lacks an operand in the second and fourth sub-fields.

ALU0 receives one operand from first subfield, and ALU1 receives one operand from the third subfield.

Format 3145 shows the first and third 13-bit Pkt/Reg Operand sub-fields each independently coded according to TABLE 7A. The second and fourth sub-fields however, are each occupied with TABLE 7B codes for respective Immediates to provide immediate operands for use together with the operands obtained via the first and third sub-fields respectively. A first 2-operand ALU0 operation is performed using the first and second sub-field operands. A second 2-operand ALU1 operation is concurrently performed using the second and third sub-field operands.

Before describing additional formats 3150-3170, some examples motivate different situations to use different mask lengths 8 or 16 bits to detect an offending packet. To pick various TCP flags, 8 bit immediate masks are used. For this purpose, "immediate mask" means a mask specified in fields identified in FIG. 9 as Mask[N:0]. "Immediate mask" does not mean masking an immediate in this embodiment. To pick the IP Version field in an IP header, use an 8 bit immediate mask.

To compare only particular portions of an IP address, use 16 bit immediate masks. The SPF also allows for mask consisting of a string of ones (1's) using the bit field in each Pkt/Reg Operand. The string of ones (1's) are used to omit or include a required number of bits in delivering an operand for calculation.

Use of an 8-bit mask Mask[7:0] In formats 3115, 3120, 3125, 3130, and 3135 is denoted by a format code "11000" in the subfield 3105.8. See also Table 7A.

A 16-bit mask as in formats 3150, 3155 and 3160 is denoted by the code "11001" in subfield 3105.16.

Different lengths of Immediates are also specified, because different lengths of arithmetic are used in different formats. Use of an 8-bit immediate for an operand is denoted by format code "11100" in subfield 3107.8. A 16-bit immediate operand is denoted by 11101 in subfield 3107.16. The decoder extracts the correct number of bits from the operand field based on the format code.

Format 3150 shows the first 13-bit Pkt/Reg Operand subfield coded according to TABLE 7A. The rest of the operand field has additional further TABLE 7B subfields for 16-bit Mask and 16-bit Immediate. Two coding bits 3152 are situated left of the 16-bit Immediate subfield. The two bits 3152 between 16-bit mask and 16-bit immediate are set to "01" to specify this format 3150. If those two bits 3152 are "00", then the operand field 3010 (FIG. 8) is checked for another Pkt/Reg Operand code in the last 13-bit field. Five coding bits 3105.16 for 16-bit Mask selected from TABLE 7B are shown as five leading bit positions in Format 3150 left of the Mask subfield. Regarding Mask [15:0] and Immediate[15:0], Format 3150 activates 16-bit arithmetic, wherein for 32-bit ALU purposes, additional more-significant 16-bits left of the mask and additional more-significant 16-bits left of the 16-bit immediate field are in effect set to zero.

This instruction format 3150 is an Operand portion of an instruction that does the following: A) uses a 16-bit operand identified in the Pkt/Reg Operand[12:0], B) applies the 16-bit Mask[15:0] to that 16-bit operand and delivers the result as the first operand to ALU0, and C) delivers the 16-bit Immediate[15:0] operand as the second operand to ALU0.

Format 3155 shows the first and fourth 13-bit Pkt/Reg Operand sub-fields each independently coded according to TABLE 7A. Where the second and third sub-fields would be, however, is occupied by a 16-bit Mask with five TABLE 7B code bits left of the Mask, and five filler bits just right of the Mask. ALU0 receives two operands.

Format 3160 is similar to format 3155 except that format 3160 lacks the operand in the fourth sub-field. ALU0 receives a single 16-bit operand.

Format 3165 shows the first Pkt/Reg Operand sub-field coded according to TABLE 7A. Next comes a 16-bit Immediate with five TABLE 7B code bits left of the Immediate, and five filler bits just right of the Immediate. The fourth sub-field is unused. ALU0 receives two operands.

Format 3170 shows the first Pkt/Reg Operand sub-field coded according to TABLE 7A. Where the second, third and fourth sub-fields would be, however, is occupied by a 32-bit Immediate located at a predetermined 32-bit field position therein. The 32-bit Immediate is denoted by format code "11110" in the leading bits 3107.32. That code 11110 means that a 32-bit immediate operand is entered at the predetermined 32-bit field position. ALU0 receives one 32-bit operand.

ALU Function Fields. In FIG. 8, ALU subfield 3020 has first and second ALU arithmetic and logical operation codes FUNCTION0 and FUNCTION1 each four bits long. The FUNCTION0 code specifies a single or dual operand arithmetic/logic function for ALU0. This function is applied to one or both of the first and second operands specified in the instruction, depending on whether the function is a single-operand function or a dual-operand function.

The encoding provides sixteen codes in TABLE 10 representing functions of: Less Than, Less Than or Equal To, Greater Than, Greater Than or Equal To, Equal to Zero, Not Equal to Zero, Equal to One, Not Equal to One, Equal, Not Equal, Add, Subtract, Bit-wise AND, Bit-wise OR, Result Same as Operand, and No Function. The output of each FUNCTION0 function is in the form of a 32-bit number called Word0 and a single bit value called Flag0. The single bit value is either the carry bit from an add/subtract operation or the Boolean result from a comparison function. Additional arithmetic and logical functions are added as desired by providing additional code bits and additional hardware to execute such functions.

TABLE 10

| | | | | ARITHMETIC/LOGICAL OPERATION CODES | | | |
|---|---|---|---|---|---|---|---|
| | Function | | | Description | Operands Required | 32-bit result | 1-bit flag result |
| 0 | 0 | 0 | 0 | Less Than | 2 | 0 | Set if true |
| 0 | 0 | 0 | 1 | Less Than Equal To | 2 | 0 | Set if true |
| 0 | 0 | 1 | 0 | Greater Than | 2 | 0 | Set if true |
| 0 | 0 | 1 | 1 | Greater Than Equal To | 2 | 0 | Set if true |
| 0 | 1 | 0 | 0 | Equal to Zero | 1 | 0 | Set if true |
| 0 | 1 | 0 | 1 | Not Equal to Zero | 1 | 0 | Set if true |
| 0 | 1 | 1 | 0 | Equal to One | 1 | 0 | Set if true |
| 0 | 1 | 1 | 1 | Not Equal to One | 1 | 0 | Set if true |

TABLE 10-continued

ARITHMETIC/LOGICAL OPERATION CODES

| Function | | | | Description | Operands Required | 32-bit result | 1-bit flag result |
|---|---|---|---|---|---|---|---|
| 1 | 0 | 0 | 0 | Equal | 2 | 0 | Set if true |
| 1 | 0 | 0 | 1 | Not Equal | 2 | 0 | Set if true |
| 1 | 0 | 1 | 0 | Add | 2 | Sum | Set if overflow |
| 1 | 0 | 1 | 1 | Subtract | 2 | Difference | Set if output is negative |
| 1 | 1 | 0 | 0 | Bit-wise And | 2 | Bitwise AND | 0 |
| 1 | 1 | 0 | 1 | Bit-wise OR | 2 | Bitwise OR | 0 |
| 1 | 1 | 1 | 0 | Result is same as Operand | 1 | Same as operand | 0 |
| 1 | 1 | 1 | 1 | No Function (NOF) | 0 | 0 | 0 |

The ALU0 and ALU1 are assigned function0 and function1 respectively. In case only one function is to be performed in an instruction, function0 field is used in this example.

In subfield 3020, a second arithmetic and logical operation code FUNCTION1 for ALU1 is also four bits long. This field independently specifies a single-operand or dual-operand arithmetic/logic function and with the same sixteen encoding choices in TABLE 10 as described for FUNCTION0. FUNCTION1 is applied to one or both of the third and fourth operands, if either of them are specified in the instruction. The output of FUNCTION1 is in the form of a 32-bit number called Word1 and a single bit value called Flag1 respectively analogous to Word0 and Flag0 described hereinabove.

In FIG. 7, and considering the instructions from a hardware viewpoint, ALU Unit 2640 has first and second muxes 2782 and 2784 feeding respective inputs of a first ALU (arithmetic/logic) circuit 2792 that actually performs arithmetic or logical operations of a type driven by particular instruction decoder outputs made active to effectuate the operations represented by the operation code(s) of the current instruction in Instruction circuit 2630. Also, third and fourth muxes 2786 and 2788 feed respective inputs of a second ALU circuit 2796.

Each of the four muxes 2782, 2784, 2786, 2788 has three inputs A, B, C. Input A is coupled to Packet Data Extraction Logic 2510. Input B of each of said four muxes is coupled to bits in a respective one of the four 13-bit segments of the Operand field of the current instruction in Instruction circuit 2630 or to segments as decoder 2630 determines according to description of FIG. 9 and TABLES 8 and 9. Input C of the each of said four muxes is coupled to an internal register in the block of Internal registers 2720 as directed by MSB and register bits in the Operand field(s) of the current instruction in Instruction circuit 2630.

The selector controls of muxes 2782, 2784, 2786, 2788 are driven by further instruction decoder outputs made active to respectively effectuate the operations represented by MSB bits in the four 13-bit segments of the Operand field of the current instruction in Instruction circuit 2630.

Logic block 2660 is driven by yet further instruction decoder outputs made active to respectively effectuate the operations represented by the two 8-bit Limit/Jump/Save codes of field 3030 of the current instruction in Instruction circuit 2630. The save source and destination fields drive selector controls of muxes in Logic block 2660 to deliver selected save sources from ALU circuits 2792 and 2796 of ALU Unit 2640 to selected save destinations in Internal Registers 2720. The Jump bits control the Program Counter 2710. The parallelism of fields in the instructions of the instruction set facilitates fast decode and execution in Rule Engine 2520 at very high speed clock rates demanded by present and future networking and telecommunications apparatus.

Operation Field. The operation field 3030 of FIG. 8 has two 8-bit subfields, each of which specifies a limit, save or a jump operation. All of these operations involve two arguments that are specified within the instruction.

In each Limit/Jump/Save 8-bit code, two bits encode an operation field as enumerated below, and the six bits thereafter are differently used as described for Limit, Save and Jump:

00=N Limit (Condition field, Limit field). Condition field holds a 3-bit code to specify the condition. Limit field holds a 4-bit code specifying Limit register.

01=Save (Source field, Destination field). Source field holds a 3-bit code specifying the source data. Destination field holds a 4-bit code specifying destination.

10=Jump (Condition field, Destination field). Condition field holds a 3-bit code to specify the condition bit on which the jump depends. Destination field holds a 4-bit code that specifies how the program flow is modified when the jump is executed.

11=NOP. No operation.

In case of limit operation, one of the arguments is a condition and the other argument is a limit register. In case of save operation, one of the arguments is source data and the other argument is a destination where the data will be saved. In jump operation, the first argument is a condition that must be true for the jump to occur and the second argument is a destination to which the program control will be moved to. The destination argument in a jump operation also specifies specific destinations that lead to the current packet being immediately rejected or accepted.

Limit Operation. In a limit operation, the condition argument specifies a condition that must be true for the specified Rate Limit Down Counter to be decremented if non-zero, or must be true for the packet to be dropped if that Down Counter is zero.

TABLE 11 below shows the codes for condition used in the limit operation.

TABLE 11

LIMIT CONDITIONS

| Condition | | | Description |
|---|---|---|---|
| 0 | 0 | 0 | Single bit flag (flag0 from function 0) |
| 0 | 0 | 1 | Single bit flag (flag1 from function 1) |
| 0 | 1 | 0 | Logical OR of flags (flag0|flag1) |
| 0 | 1 | 1 | Logical NOR of flags (!(flag0|flag1)) |
| 1 | 0 | 0 | Logical AND of flags (flag0 & flag1) |
| 1 | 0 | 1 | Logical NAND of flags (!(flag0 & flag1)) |
| 1 | 1 | 0 | XOR of flags (flag0 ^ flag1) |
| 1 | 1 | 1 | Unconditional Decrement/Limit |

The 4-bit limit register code values 0000 through 0011 respectively specify a corresponding one of the four limit registers L0-L3.

Save Operation. The arguments for a save operation include a 2-bit code "01" followed by a code for source data and a code for the destination. The source is either a single bit data or a 32-bit word. The single bit data is either a flag from the functions or a logical OR/AND of the flags. The 32-bit word is the result of the ALU arithmetic/logical functions.

TABLE 12 lists the codes used to specify save source data.

TABLE 12

SAVE SOURCES

| Save Source | | | Description |
|---|---|---|---|
| 0 | 0 | 0 | Single bit flag (flag0 from function 0) |
| 0 | 0 | 1 | Single bit flag (flag1 from function 1) |
| 0 | 1 | 0 | Logical OR of flags (flag0\|flag1) |
| 0 | 1 | 1 | Logical AND of flags (flag0 & flag1) |
| 1 | 0 | 0 | Output of function (word0) |
| 1 | 0 | 1 | Output of function (word1) |
| 1 | 1 | 0 | Reserved |
| 1 | 1 | 1 | Reserved |

The destination register codes in a save operation are 0-3 hex for T0-T3 registers, 4-7 hex for B1-B4 base registers, and 8-F hex for working registers R0-R7, respectively.

For some instructions, the rule engine 2620 extracts the operand from the current packet. To determine the packet bits to be used as operands, Rule Engine 2520 refers to one or more base registers. When an instruction causes a change in value of any of the base registers B1-B4, it causes the rule engine 2520 to wait for one clock cycle before executing the next instruction. This rule engine 2520 is a pipelined processor in this example. A change in the value of a base register B1-B4 causes the prefetched operand values to become stale and so these values are fetched again. The clock cycle inserted allows rule-engine 2520 to fetch the data again before the instruction using this data is executed. The instructions that use packet data are delayed by a clock cycle if the previous instruction caused a change in the base register B1-B4 that is referenced in the current instruction.

Jump Operation. For jump operation, one of the operands is a condition that must evaluate to true for the jump operation to occur. The other operand is the destination to which the program counter will point if the jump operation is executed. The format of the jump operation is 2-bit code "10" followed by a 3-bit condition code and 4-bit destination code. The condition in a jump operation is either one of the flags from the output of the arithmetic/logic unit 2640 or a logical AND/OR of the flags. The codes for conditions are listed in TABLE 13.

TABLE 13

JUMP CONDITIONS

| Jump Condition | | | Description |
|---|---|---|---|
| 0 | 0 | 0 | Single bit flag (flag0 from function 0) |
| 0 | 0 | 1 | Single bit flag (flag1 from function 1) |
| 0 | 1 | 0 | Logical OR of flags (flag0\|flag1) |
| 0 | 1 | 1 | Logical NOR of flags (!(flag0\|flag1)) |
| 1 | 0 | 0 | Logical AND of flags (flag0 & flag1) |
| 1 | 0 | 1 | Logical NAND of flags (!(flag0 & flag1)) |
| 1 | 1 | 0 | XOR of flags (flag0 ^ flag1) |
| 1 | 1 | 1 | Unconditional Jump |

The jump operation results in a change of program execution flow. The jump destination determines the next instruction that will be executed by the rule engine 2520. The destination is only specified as a positive offset to the current value of the program counter 2710. The value in the program counter can result in the rule engine 2520 skipping a given number of instructions instead of executing the next instruction. In addition, the destination field can instruct the rule engine 2520 to immediately reject or accept the current packet without any further checks. The rule engine then goes back to the first instruction and waits for a new packet to arrive before it executes any further instructions.

The sixteen 4-bit codes for each Jump destination represent the following possibilities:

Accept current packet, return to instruction zero and wait for next packet.

Reject (Drop) current packet and return to instruction zero and wait for next packet.

c), d), . . . n), o), p) Go to instruction at offset +2, +3, . . . +13, +14, or +15 from program counter value.

The rule engine 2520 is a pipelined processor in this example. When rule engine 2520 executes a jump operation, there is a delay of one clock cycle before the next instruction is executed.

The operations specified in the two operation fields are independent of each other. However, it is possible that conflicting operations are specified in the operation fields of an instruction. When conflicting operations are specified and conditions of both operations evaluate to true; then the execution flow is determined as described below:

1. If one of the ALUs has a limit/jump operation that will cause the packet to be dropped, then the packet is dropped irrespective of what the other ALU indicates.
2. If case 1 above is false and one of the ALUs has a jump operation that will cause the packet to be accepted, then the packet is accepted and the rule engine 2520 returns to idle state (instruction zero, wait until next packet).
3. If case 1 and 2 above are false and one of the ALUs has a jump to offset with the respective condition true, the jump is executed. If there is conflicting jump-to-offset information in the two ALUs, ALU0 is given priority.

No Operation. If there is no Save, Jump or Limit operation specified in the operation field, a two-bit code "11" is entered and interpreted as a No Operation (NOP). There is no change in execution flow, no change in any register values or Rate Limit Down Counters when a no operation is encountered.

Rule engine 2620 is suitably programmed such that a decision to accept or discard the current packet is made before all instructions have executed. If the rule engine reaches the last instruction and it does not result in a decision to accept/reject the packet, then the execution flow does not stop and all instructions from the first instruction are executed again until the end of packet is reached.

Figure 10:
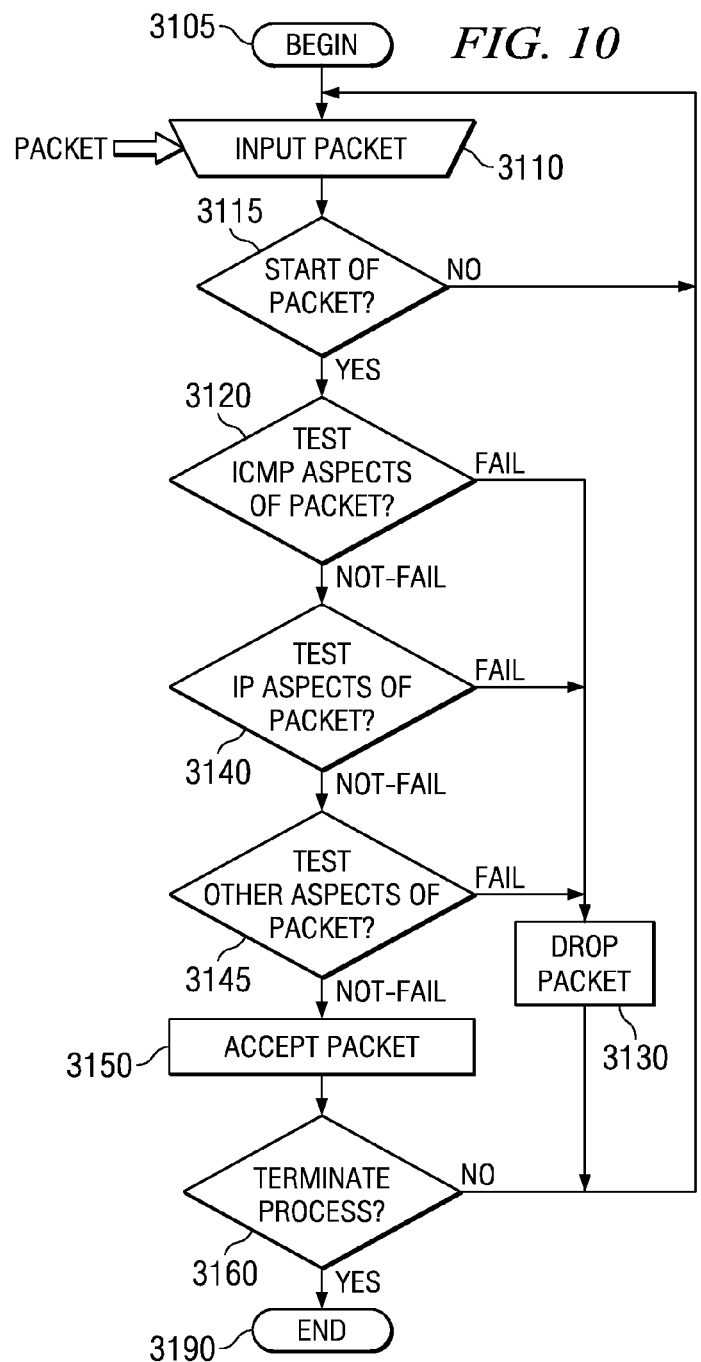
FIG. 10 is a flow diagram of an inventive packet filtering process.

Example Program. FIG. 10 illustrates an example of a process of monitoring and dropping packets according to a hereinbelow-listed example of pseudo-code programming. According to the process, Rule Engine 2520 detects and drops packets that appear to be Denial of Service (DoS) traffic.

In FIG. 10 and with reference to the pseudocode, a packet filtering process commences with a BEGIN 3105 and proceeds to a step 3110 (IDLE) to monitor the bus and input a packet. Then a step 3115 determines whether a packet is starting. If not, operations loop back to step 3110 until a packet arrives. When a packet starts, operations proceed to a step 3120 to test ICMP aspects of the packet. In the hardware of FIG. 6, when the start of a new packet occurs, the Rule Engine jumps to a point (ICMP in the pseudocode) corresponding to step 3120. At point ICMP, a protocol check is made. If the protocol is ICMP, then a check is made whether the ICMP Limit is Zero. ICMP Limit is a field in the ICMP header. If ICMP Limit is Zero, the process drops the packet and jumps back to IDLE to await the next packet. The process has a series of various types of ICMP tests such as fragmented packet and packet too small. If any ICMP test is failed, the process drops the packet and jumps or branches back to step 3110 to await the next packet.

In FIG. 10, if the ICMP tests are not failed in step 3120, the process proceeds or jumps to a step 3140 (pseudocode point IP) to check the Internet Protocol (IP) aspects of the packet. The process of step 3140 has a series of various types of tests based on aspects of packets that are unacceptable, such as source equals destination, fragment characteristic is too large, and packet too small. If any IP test is failed, the process branches to a step 3130 to drop the packet and then goes back to step 3110 (IDLE) to await the next packet.

If all the IP tests are passed in step 3140, then operations proceed to a step 3145 to test still other aspects of the packet as described in Tables 1 and 2 and else wherein herein. If any of the other aspects fail in step 3145, the process branches to step 3130 to drop the packet and then goes back to step 3110 (IDLE) to await the next packet.

If all the other aspects testing of step 3145 are passed, the packet is accepted in a step 3150. Operations proceed to a decision step whether the process is terminated due to software or hardware reset or otherwise. If the process is terminated, operations go to RETURN 3190 and if not terminated, operations go back to step 3110 (IDLE) to await the next packet.

```
IDLE:
  Jump to ICMP if start_of_packet
ICMP:
  If (protocol = = ICMP)
    If (ICMP_limit = = Zero)
      Drop packet and jump to IDLE
    Else
      Decrement limit_counter
      If (fragmented packet)
        Drop packet and jump to IDLE
      If (end_of_packet & (total_size<96))
        Drop packet and jump to IDLE
    Jump to IDLE
  Else
    Jump to IP
IP:
  If (source_ip = = dest_ip)
    Drop packet and jump to IDLE
  If (fragmented and (fragment_offset+ip_size)>2^16)
    Drop packet and jump to IDLE
  If (end_of_packet & (total_size<96))
    Drop packet and jump to IDLE
  Accept the packet and jump to IDLE
```

The following memory-mapped Registers are designated by giving the register name as the initial phrase at left in TABLE 14. Reset example values are all zero unless otherwise noted. The listed order is a suitable order of the addresses of the registers as 4 byte spaces contiguously ordered in address space starting with ID and Version at the lowest address.

TABLE 14

| REGISTER NAME | OPERATION AND DESCRIPTION |
|---|---|
| MEMORY-MAPPED REGISTERS | |
| ID and Version | The SPF Identification and Version register holds SPF Module ID, SPF Major Revision, and SPF Minor Revision fields. Reset Module ID and Major Revison to Predetermined values. |
| Status | SPF is Busy/idle. SPF Busy means packet processing or logging is in progress. |
| Control | Has control bits as described in text. |
| Drop Count | Drop counter indicates the number of packets dropped so far. Drop counter does not roll over and is cleared by writing all ones or all zeroes. |
| Software Reset | Setting a bit initiates a software reset of the SPF and stays high until the reset has completed. |
| Rate Limit Pre-scale | VBUS clock is divided by the pre-scale value for use in rate limiters. The pre-scale value is used to create rolling time intervals for use in rate limiting operation under control of the Rate Limit registers. |
| Rate Limit L0-L3 | Four rate limit registers. The number of packets corresponding to a filter that will be allowed per unit time interval. The filters are programmed in the Rule Engine. Time interval is determined by the SPF pre-scale register. |
| Constant C0-C7 | Eight constant registers. The contents of a Constant register are used as input to any instruction that references it. |
| Instruction Word 2, 1, 0 | Three registers together compositely hold the Instruction Word. |
| Instruction Control | Two bits Write Enable and Read Enable respectively specify a write or read between instruction RAM and the three registers Instruction Word 2, 1, 0. To read or write instructions, SPF 2500 processing is stopped. When the Rule Engine is processing instructions, the instruction memory is not accessed. The address for access to the instruction RAM 2650 is provided by a multi-bit Instruction Pointer field in the Instruction Control register. |
| Log Begin Address | SPF starts to write log data to memory starting from the address given in this field. |
| Log End Address | This register along with Log Begin Address register defines the memory range for writing log data. The range should be a multiple of four 32-bit words, in this example. Log End |

TABLE 14-continued

MEMORY-MAPPED REGISTERS

| REGISTER NAME | OPERATION AND DESCRIPTION |
| --- | --- |
|  | Address is a look ahead register, so the value entered should be the next word address (i.e., last word address plus 4). In one example of operation, SPF writes Log data to memory until it reaches the address specified in this register. The log data is discarded if this location is already written and no other location is free. If overwrite on log space is enabled, then the address pointer of the data logger wraps around and goes back to log start address. Reset value is 1000 binary. |
| Log Hardware Pointer | Holds the address of the next location in memory to which SPF will log information. |
| Log Software Pointer | Records the address which host software has reached in reading the log. This register specifies the address where software is to do next read. Software informs SPF about memory roll-over by writing contents of Log End Address register into this Log Software Pointer register. |
| Filter Code Map 0 and 1 | These two registers have four fields each to map drop codes 7-4 to log threshold fields in Log Threshold and Count registers 7-4 and map drop codes 3-0 to log threshold fields in Log Threshold and Count registers 3-0 respectively. |
| Log Threshold and Count 0, 1, . . . 8 | Nine registers operate similarly and have two numbers each pertaining to the drop code for the register. For instance, the register 3 has two fields that respectively hold the statistics number of packets dropped for drop code 3 and a log threshold field specifying the number of packets to be dropped before logging starts. Reset log threshold to a default value such as 0xA hex.<br>The Interrupt Registers are memory mapped and include |
| Interrupt Frequency Control | Holds number of times that thresholds must be met before a drop interrupt is triggered to host. |
| Interrupt Raw Status | One-bit status of interrupt signal without mask. This holds the Raw state of interrupt i.e. without mask. The hardware interrupt is latched in this register and is only cleared when a one is written to either Raw Status register or Interrupt Status After Mask register. Writing a zero has no effect on the Raw Status register. |
| Interrupt Status After Mask | One-bit status of masked interrupt signal. This is the actual interrupt given to the system. It is the result of bitwise AND operation of Raw Status and Mask registers. Once the interrupt is sensed by the system, the Interrupt Status After Mask register is suitably cleared by writing one to this register or to the Raw Status register during ISR execution. Writing zero has no effect on this Interrupt Status After Mask register. |
| Interrupt Mask Set | Writing one to a mask set bit in this register enables the interrupt. By default, the interrupt is disabled and needs to be enabled by writing a one to this Mask Set register. Writing a zero has no effect on this register. Writing to Mask Set register also sets Mask Clear register. |
| Interrupt Mask Clear | Writing one to a mask clear bit in this register disables interrupt. Writing a zero has no effect on this register. |

In the Control Register the following Control bits are used. Log Overwrite Enable bit, when set, causes the SPF to overwrite previously logged data whether or not software has updated the software working pointer. Overwriting occurs if there is new data but no space to write in the range indicated by the Log Begin Address and Log End Address registers.

In the Control Register, setting a Log Enable bit enables SPF to log information about dropped packets to memory.

A Rule Engine Log Enable bit, when set, enables SPF to log data from the Rule Engine 2520. The default is to log data from the Extractor 2510.

An Extractor Bypass Enable bit, when set, disables Extractor 2510 from providing offset information to the Rule Engine 2520. To determine if a packet should be discarded (dropped), the Rule Engine 2520 selects and loads each of the Base registers 2770 to be used in the determination.

A Drop Enable bit is set to activate packet drops.

An SPF Enable bit is set or toggled on to enable operation in the SPF as a whole. Writing a zero, or toggling to reset, to de-assert SPF Enable takes effect to disable SPF operation if and when the status SPF Busy bit is low, so that SPF stops only on packet boundaries. The SPF instruction memory 2620 is accessible by host processor when the SPF Enable bit is de-asserted.

Interrupts. The SPF 2500 has one interrupt (reported as level and pulse) that is used to signal the host processor 2540 when a number of logged packet drops has an excessive number and exceeds a threshold. Both level and pulse interrupt signals are provided. Either or both of these can be used based upon the interrupt implementation of the device.

The addresses of the instructions or Drop Codes in the instruction memory 2520 that cause packets to be dropped are associated with a threshold, for instance. When the threshold is met, the packet drop is logged. Each time a packet drop is logged, it is counted. When the number of logged records reaches the value specified by the Interrupt Frequency Control register, the host 2950 is interrupted. The threshold settings are controlled by host software to limit the frequency of interrupts. Writing a zero to Interrupt Frequency Control register disables the interrupt in this scenario. Whenever an interrupt is enabled and is triggered, the interrupt can be cleared by writing one to either Interrupt Raw Status register or the Interrupt Status After Mask register. See TABLE 14 for further description of Interrupt-related registers.

The interrupt service routine in SPF 2500 processes the data logs generated by event logger 2810 and triggers a higher layer application software host 2950 or off-chip that analyzes the data logs and determines if any remedial measures are required based on the information in the logs analysis & remedial feedback. This provided a dynamic operation to the packet filter system. The interrupt service routine reprograms the software pointer for the event logger 2810 to continue logging.

An example of interrupt service routine (ISR) process tasks performed by SPF 2500 upon interrupt by host 2950 are listed in the pseudocode next:

```
SPF_ISR {
    read log hardware pointer
    read log software pointer
    determine how many log entries are to be read
    read each log entry starting with the software pointer
    update software pointer to reflect the next unread entry
    clear interrupt
}
```

All the example numbers pertaining to the fields, operation codes, and operands of the instructions and other features of the SPF 2500 are illustrative and not by way of limitation.

Initialization: The packet filter is initialized by host 2950 prior to operation in use after manufacture, such as by the example initialization process shown next. See also step 3245 in FIG. 12 for loading the host software in manufacture. "Firmware" in the following loading process steps refers to the instructions stored in the instruction memory 2620 and 2650.

1. Initialize the firmware by programming the internal memory and verify it, using Instruction Word 2, 1, 0 composite register and Instruction Control register.
2. Allocate memory for logs written by SPF and initialize the log space parameters using registers Log Begin Address, Log End Address, and Log Software Pointer.
3. Program the log map registers Filter Code Map 0 and 1 to associate drop codes with the log thresholds.
4. Program log thresholds in Log Threshold And Count registers 0-8.
5. Program Constant registers C0-C7 if called for in the firmware.
6. Program the Rate Limit Pre-Scale register and Rate Limit L0-L3 register if called for in the firmware.
7. Program the Interrupt Frequency Control Register and Interrupt Mask Set Register, to set up interrupts.
8. Program the Control Register bits to enable SPF filter and logger.

Returning to FIG. 6, the activity of the static packet filter 2500 is logged by event logger 2810 to log intrusions. Based on the configuration established by the host 2950, the event logger 2810 writes specific fields of the incoming packet that violate a particular rule to a system memory 2900 for software diagnostics. The specific fields written by event logger 2810 are those corresponding to rule violations that the Rule Engine in block 2520 has detected. For purposes of the writes to system memory 2900, the starting address of the system memory space 2900 and the total available such memory space 2900 are programmed (configured) by host 2950 into the packet filter configuration space by entries in a pair of registers Log Begin Address and Log End Address.

In addition, the event logger 2810 writes to memory only after the number of bad frames detected exceeds a programmed threshold entered in a register called Interrupt Frequency Control. This threshold provides a mechanism to limit the amount of data that is written by the packet filter 2500 to the system memory 2900.

The logging module allows controlling the frequency at which events are logged to the memory. A set of nine counters called Log Threshold and Count 0, 1, . . . 8 are provided and, of these, eight can be mapped to any address of the instruction RAM 2620 using Filter Code Map registers. This mapping logically associates the log information with the Rule Engine instruction that caused the packet to be dropped. The ninth ($9^{th}$) counter is not associated with any particular instruction and it can be used to count the packets that were dropped at instructions not mapped to any of the other eight counters.

For each of the nine counters and registers Log Threshold and Count 0, 1, . . . 8, there is a register field in each register to store the minimum number of attacks that must be detected before any information is logged to memory 2900. Only when this threshold is met, and logging is enabled, does the host interface module write log data into system memory 2900. The memory area used to log is specified by the host 2950 in the Log Begin Address register and Log End Address register.

The event logger 2810 continues to write data to memory 2900 until event logger 2810 runs out of space and a Log Overwrite Enable bit is disabled in the Control Register. With each update of the log, a register named Log Hardware Pointer is updated. This information is accessible by the host 2950 to determine how much data has been logged. The software in turn keeps a pointer register called Log Software Pointer updated to inform the SPF 2500 about the next register address in SPF memory space from which information will be read by the host 2950 software. Software program corrects the value in the Log End Address register to enable hardware to determine roll-over location. The SPF 2500 considers all space in memory 2900 less than the address entered in the Log Software Pointer register as available for logging.

In case the Log Overwrite Enable control bit is set, SPF 2500 ignores the Log Software Pointer register and logs data irrespective of software read log status. Note that the memory space allocated for logging is a multiple of four 32-bit words, and the Log End Address register is suitably loaded with the byte address of the next byte following the last log entry. For example if 16 bytes space is allocated for SPF logging from address 0x1400_0000, then the address value entered in Log Begin Address register should be 0x1400_0000 and the address value entered in Log End Address register should be 0x1400_0010.

The host 2950 software sets a Log Enable bit in the Control Register to activate logging. Setting the Log Enable bit has no effect on the log threshold based counters Log Threshold and Count 0, 1, . . . 8, and they are always active. In addition to the log threshold-based counters, SPF 2500 has at least one master Drop Count register which tracks the total number of packets dropped thus far from each packet bus like 2512. This Drop Count counter does not roll over and is cleared for re-run by the host processor 2950 once the Drop Count reaches the maximum value.

The format in which packet information is written in the memory 2900 by the event logger 2810 is shown in TABLE 15.

TABLE 15

PACKET STRUCTURES

| Packet Organization for TCP/UDP packets | | |
|---|---|---|
| Drop Code | — | — Protocol |
| Source | IP | Address |
| Destination | IP | Address |
| Source TCP/UDP Port | Destination TCP/UDP Port | |
| Packet Organization for ICMP packets | | |
| Drop Code | — | — Protocol |
| Source | IP | Address |
| Destination | IP | Address |
| Type Code | | Checksum |

Each entry logged by event logger 2810 to memory 2900 has a drop code associated with it. The drop code is the address in instruction memory 2620 that actually triggered the drop. Up to eight drop codes can be monitored in this manner by the respective Log Threshold and Count Registers. In addition to drop code, the protocol, IP addresses and source/destination ports associated with the dropped packet are recorded, as shown in TABLE 15.

Log data is supplied by either Extractor module 2510 or by Rule engine in block 2520. A Rule Log Enable bit is set in the Control Register by host 2950 to use log data from Rule Engine and is cleared to use data of TABLE 10 supplied by the Extractor 2510.

When logging is done through the rule engine, contents of internal registers R4-R7 are written to memory 2900. The format of packet information stored is programmed in the rule engine except for the drop code field which is static. The format in which rule engine information is written in the memory 2900 by the event logger 2810 is shown in TABLE 16.

TABLE 16

RULE ENGINE LOG

| | |
|---|---|
| Drop Code | Register 4[23:0] |
| | Register 5[31:0] |
| | Register 6[31:0] |
| | Register 7[31:0] |

The rule engine 2520 programming in instruction memory 2620 ensures that these registers contain all required information that is to be recorded before the packet drop instruction is executed. As soon as the drop instruction is executed, the event logger 2810 starts to send data from the registers R4, R5, R6 and R7 to the system memory and the contents of these registers are temporarily frozen.

In FIG. 6, the static packet filter 2500 provides a Host Program Interface 2820 in Host Interface block 2530. Host Program Interface 2820 includes a slave interface using VBUSP bus protocol to communicate with the host processor 2540 and its software. Host Program Interface 2820 provides access by the host processor software to load and modify the SPF registers and the instruction memory 2620 of the rule engine 2520.

In addition, Host Program Interface 2820 includes a master interface using VBUSP bus protocol so that event logger 2810 and any other parts of SPF module 2500 interface to system memory 2900 for the purpose of storing activity logs of information about the activity of SPF module 2500 to the system memory 2900. The Host Program Interface 2820 has the following inputs: clock, instruction write enable, instruction select, instruction host 5-bit address, instruction 5-bit address, an instruction-wide write-data input and an eight-32 bit-word wide input from RAM for the statistics registers (Log Threshold and Count). Outputs include: an instruction-wide read-data output, and an eight-32 bit-word-wide output to RAM for the statistics registers.

Various bus related lines and signals are: VBUS Clock, VBUS Reset, Slave VBUSP signals, Master VBUSP signals, and a Master DMA channel indicator. The Slave VBUSP Signals are Request, Direction, First, Last, Byte Enables, Byte Count, Address, Write Data, Write Ready, Read Data, and Read Ready. The Master VBUSP Signals as in FIG. 11 are Data Type, Request, Direction, First, Last, Byte Enables, Byte Count, Address, Write Data, Write Ready, Read Data, and Read Ready.

The Static Packet Filter 2500 in one example has the instruction memory 2620 implemented as a two port RAM (64 deep×78 wide implemented as a register file) with asynchronous read and clocked write access for storing firmware.

The Host Program interface 2820 thus allows host processor reading from and writing to the instruction memory 2620 in the SPF. In addition, the SPF 2500 and/or host processor 2950 have functionality to copy out the statistics registers in SPF host interface 2820 to system memory and loading the statistics registers from system memory.

Figure 11:
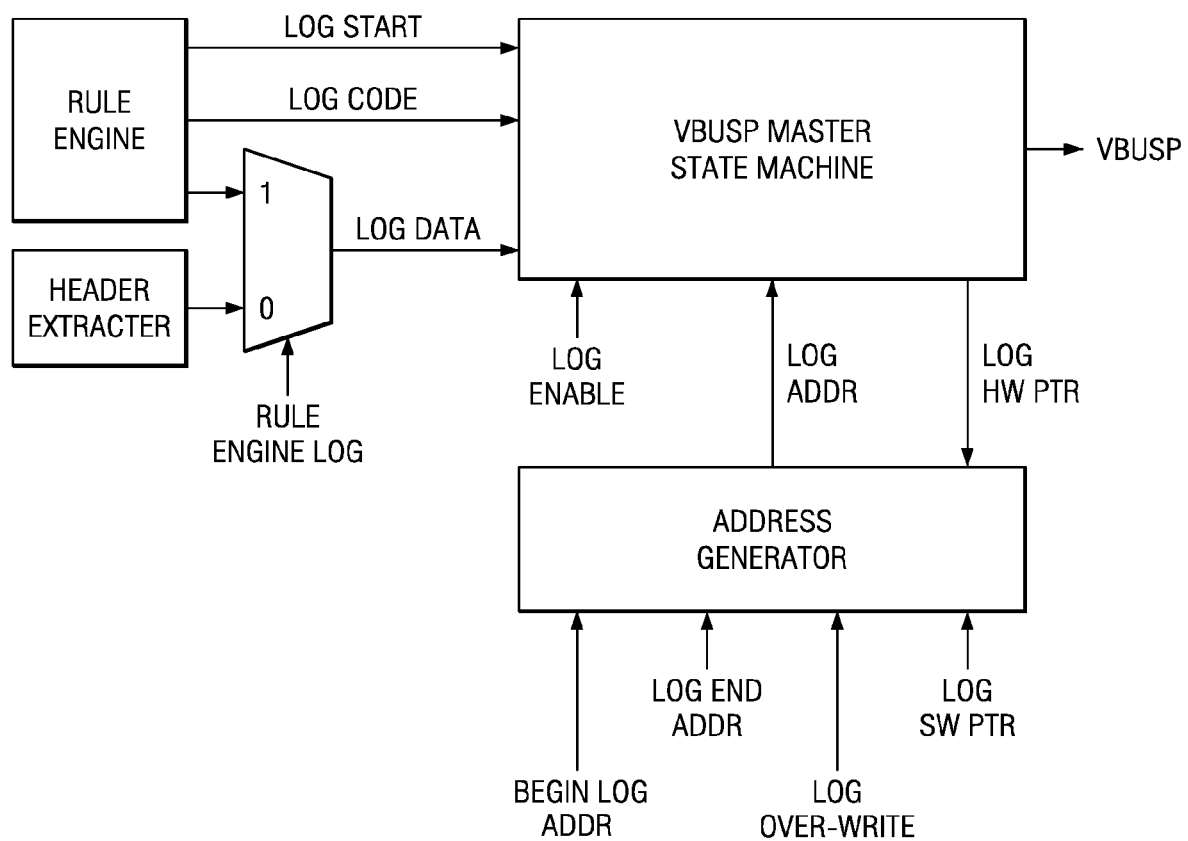
FIG. 11 is a block diagram of an inventive host interface for the inventive packet processor of FIG. 6.

An embodiment of the host program interface as shown in FIG. 11 has the VBUSP Master State Machine coupled to the host bus such as bus 1885 or 1859 of FIG. 4, with signals noted hereinabove. The host 2950 software sets a Log Enable bit in the Control Register to activate logging. As the rule engine detects events, it supplies a signal (log_start) and a drop code of the event (log_code) to the event logger 2810 (not shown in FIG. 11) that is coupled to VBUSP Master State Machine.

Log Data is also supplied by either Extractor module 2510 or by Rule engine 2520 via a Mux controlled by the Rule Log Enable bit (rule_engine_log). The Rule Log Enable bit is set in the Control Register by host 2950 to use log data from Rule Engine and is cleared to use data (e.g., from TABLE 4) supplied by the Extractor 2510.

In FIG. 11 and FIG. 6, the VBUSP Master State Machine continues to write data from event logger 2810 to memory 2900 by an Address Generator of FIG. 11 successively addressing the memory-mapped log registers of TABLE 14 with addresses (log_addr). The Address Generator is controlled by registers so that the memory area used to log accords with the Log Begin Address register and Log End Address register. The Address Generator generates addresses until event logger 2810 runs out of space and a Log Overwrite Enable bit is disabled in the Control Register.

In FIG. 11, with each update of the log, a register named Log Hardware Pointer is updated by the VBUSP Master State Machine and fed to the Address Generator. This information is accessible by the host 2950 to determine how much data has been logged. The software in turn keeps a pointer register called Log Software Pointer updated to inform the SPF 2500 about the next register address in SPF memory space from which information will be read by the host 2950 software. In case the Log Overwrite Enable control bit is set, SPF 2500 ignores the Log Software Pointer register and logs data irrespective of software read log status.

Design, Verification and Fabrication

Figure 12:
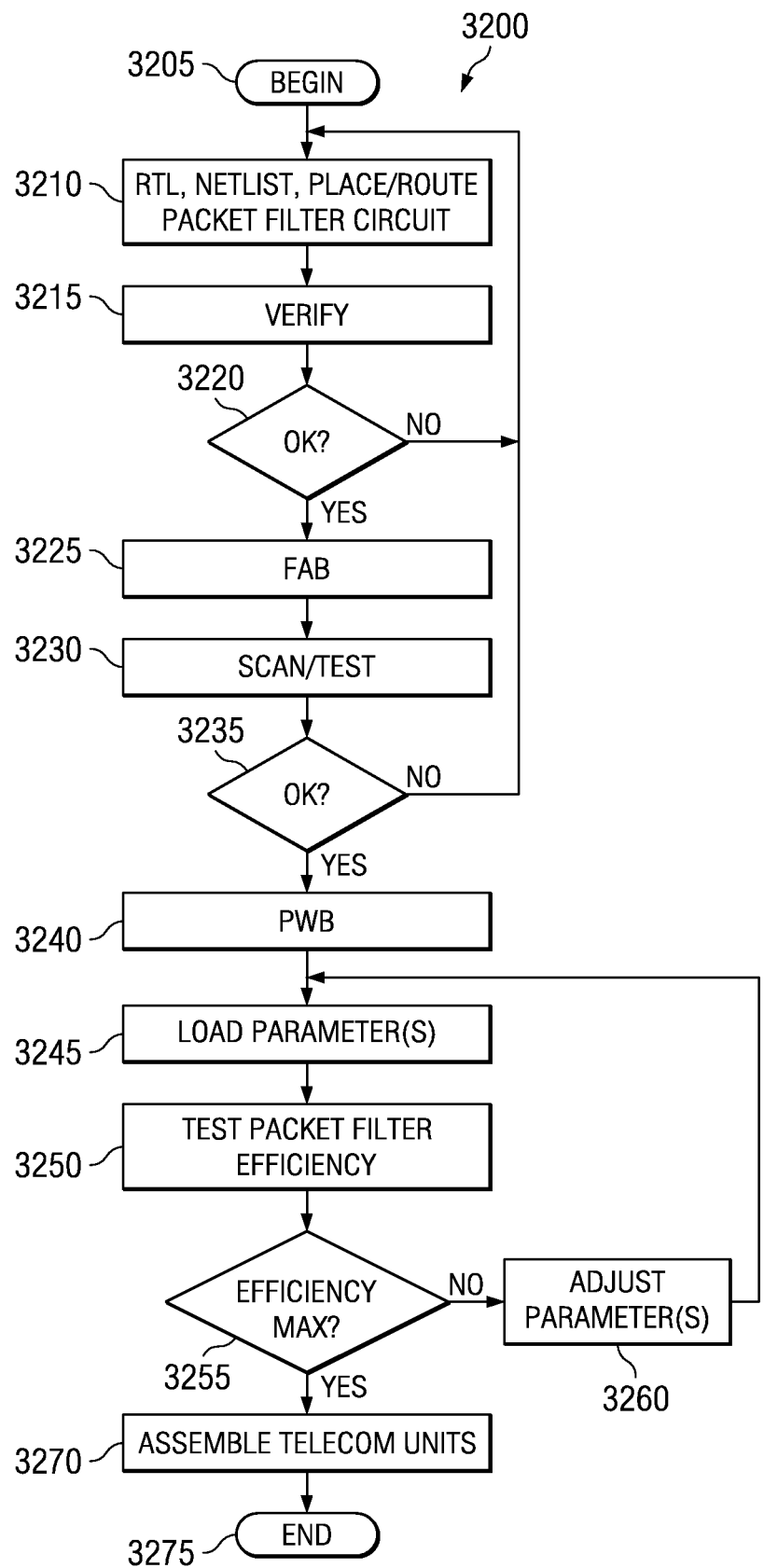
FIG. 12 is a flow diagram of an inventive process of manufacturing packet filters.

Various embodiments of an integrated circuit improved as described herein are manufactured according to a suitable process of manufacturing 3200 as illustrated in the flow of FIG. 12. The process begins at step 3205 and a step 3210 preparing RTL (register transfer language) and netlist for a particular design of a packet processing circuit including a memory for packets, a processor coupled to the memory, and a packet filter such as SPF coupled to the host processor and operable to filter packets on the fly based on knowledge about various types of packet formats and types of potential attacks. The Figures of drawing show some examples of packet filters and processes, and the detailed description describes those examples and various other alternatives.

In a step 3215, the design of the packet filter circuit is verified in simulation electronically on the RTL and netlist. In this way, the contents and timing of the extractor 2510, memory 2650 and rest of the rule engine 2520 and of the Host I/F 2530 are tested and verified in any appropriate manner. For example, the operation of the extractor 2510 is tested on different types of standard packets to verify that the correct information is being extracted from the right fields in the packets. The rule engine 2520 is tested to make sure that the circuits and instructions are producing expected results.

Further tests exercise the system to defend against predetermined streams of packets representing each of the different types of attacks tabulated elsewhere herein when running software with known characteristics can also be performed. These tests are used to suitably verify that computed results are correct, that the event logger information is correctly generated, that an adequate proportion of the predetermined attack packets are dropped, that average number of instructions per clock cycle exceeds an expected level, that average power consumption in the circuitry does not exceed an expected level and other performance criteria are met. Then a verification evaluation step 3220 determines whether the verification results are currently satisfactory. If not, operations loop back to step 3210.

If verification evaluation 3220 is satisfactory, the verified design is fabricated in a wafer fab and packaged to produce a resulting integrated circuit at step 3225 according to the verified design. Then a step 3230 verifies the operations directly on first-silicon and production samples by using scan chain methodology on the packet processing circuit. Serial scan technique is suitably used to step-by-step monitor the internal operations of such circuitry. An evaluation decision step 3235 determines whether the chips are satisfactory, and if not satisfactory, the operations loop back as early in the process such as step 3210 as needed to get satisfactory integrated circuits.

Given satisfactory integrated circuits in step 3235, a telecommunications unit based on teachings herein is manufactured. This part of the process first prepares in a step 3240 a particular design and printed wiring board (PWB) of the telecommunication unit having a telecommunications modem, a microprocessor coupled to the telecommunications modem, a packet interface circuitry coupled to the microprocessor and including a packet filter as taught herein and software and one or more parameters loaded in a step 3245, and a user interface coupled to the microprocessor. Step 3245 loads software for host 2950 so that host 2950 configures and enables SPF 2500 as described in the Initialization description elsewhere herein. The software is suitably encrypted and signed and delivered to the instruction RAM 2650 of the packet filter in a secure manner on boot-up to prevent tampering. A hardware security state machine also protects the packet filter from tampering at run-time.

The particular design of the packet filtering circuit is tested in a step 3250 by electronic simulation and prototyped and tested in actual application. Packet filter parameter(s) are adjusted for increased packet filtering efficiency in step 3255, as reflected in fast application execution, low power dissipation and other pertinent metrics. If further increased efficiency is called for in step 3255, then iterative adjustment of the parameter(s) is performed in a step 3260, and operations loop back to reload the parameter(s) at step 3245 and do further testing. When the testing is satisfactory at step 3255, operations proceed to step 3270.

In manufacturing step 3270, the iteratively determined and adjusted rate limiting parameter(s) and other packet filtering parameter(s) are loaded into the Flash memory. The components are assembled on a printed wiring board or otherwise as the form factor of the design is arranged to produce resulting telecommunications units according to the tested and adjusted design, whereupon operations are completed at END 3275.

Other Types of Embodiments

Some embodiments use particular portions of the packet filtering function described herein. Various optimizations for speed, scaling, critical path avoidance, and regularity of physical implementation are suitably provided as suggested by and according to the teachings herein.

The packet filter(s) are suitably replicated for different types of processors or repeated in different processors in the same system. For instance, in FIG. 2, any one, some or all of the RISC and DSP and other processors in the system are suitably improved with the advantageous packet filter embodiments described herein. Suppose RISC processor 1105 is a first processor so improved. Then one or more additional microprocessors such as DSP 1110, and the RISC 1424 and/or DSP 1422 in block 1420, and the processor in WLAN 1500 are also suitably improved with the advantageous packet filter embodiments. WLAN 1500 with AFE 1530, and Bluetooth block 1430 are examples of additional wireless interfaces coupled to the additional microprocessors. Each additional microprocessor includes a packet filter for defending against DoS attacks. Other improved packet filter circuits as taught herein are also suitably used in a given additional microprocessor.

The packet filtering described herein facilitates operations in RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as cores or standalone integrated circuits, and in other integrated circuits and arrays.

The packet filter is useful in other types of pipelined integrated circuits such as ASICs (application specific integrated circuits) and gate arrays and to all circuits with a pipeline and other structures and analogous problems to which the advantages of the improvements described herein commend their use.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, digital computer circuitry, ASIC circuits, PALs, PLAs, decoders, memories, non-software based processors, and other circuitry, and processing circuitry cores including microprocessors and microcomputers of any architecture, or combinations thereof. Internal and external couplings and connections can be ohmic, capacitive, direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in either the detailed description and the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A packet processor for incoming communications packets comprising:
    extractor circuitry operable to extract packet data from a packet; and
    processing circuitry operable to fetch and then execute an instruction one at a time from a set of micro-coded instructions, the instruction execution for performing an arithmetic/logic operation on the packet data from the extractor circuitry to supply a packet drop signal, and the instruction comprising:
        one or more operands, wherein each operand of the one or more operands is selected from a source comprising the instruction or the packet data, wherein executing the instruction comprises selectively masking one or more of the one or more operands with a mask that is generated from information provided in the instruction;
        at least one conditional limit field in response to which the processing circuitry is operable for controlling a rate of allowable receipt of a specific type of packet without dropping packets of the specific type; and
        at least one conditional jump field providing a condition in response to which the processing circuitry is operable for, if the condition is true, causing the processing circuitry to next fetch and then execute an instruction out of sequence relative to an immediately-preceding fetched and executed instruction in the set of micro-coded instructions.

2. The packet processor claimed in claim 1 further comprising a rate limit counter wherein said processing circuitry for controlling a rate of allowable receipt of a specific type of packet is responsive to a condition when the condition is true to adjust said rate limit counter by a predetermined amount.

3. The packet processor claimed in claim 2 wherein said processing circuitry in response to the conditional limit field is further responsive to a condition which when true, and said rate limit counter has reached an ending value, to drop the packet.

4. The packet processor claimed in claim 1 said processing circuitry is operable to perform a second arithmetic/logic operation in parallel with said arithmetic/logic operation on the packet data, and the processing circuitry in response to the conditional limit field is operable in response to both said arithmetic/logic operation and said second arithmetic/logic operation.

5. The packet processor claimed in claim 1 wherein said extractor circuitry is operable to subject a packet to a test and skip the packet depending on a result of the test.

6. A packet filtering system comprising:
    a bus for receiving communications packets having headers;
    a buffer coupled to said bus for holding at least part of a header of at least one of the communications packets;
    a storage space having a first field for a rate limit value and a rate limit counter associated with said first field, the storage space having a second field for a rate limit clock pre-scaling value;
    a packet filter having an input coupled to said bus, and an output coupled to control said buffer; the packet filter coupled to said storage space and operable to subject the header to a test which, if satisfied a number of times within a time period, said packet filter is for dropping the packet;
    wherein said number of times is evaluated relative to a changeable count in said rate limit counter;
    wherein said rate limit counter has a first value determined in response to said rate limit value; and
    wherein said time period is determined in response to said rate limit clock pre-scaling value.

7. The packet filtering system claimed in claim 6 further comprising a second bus for receiving second communications packets, said packet filter having a second input coupled to said second bus and a second output to drop a packet among said second communications packets.

8. The packet filtering system claimed in claim 6 wherein the test includes a first analysis of contents of a single header of a single packet to detect pre-determined unwanted content in the header, and a rate-based second test of headers of plural packets, and the packet filter is operable to drop a packet if the packet header fails either of the first analysis or the second test.

9. The packet filtering system claimed in claim 6 wherein the test includes an analysis of a packet to determine whether the packet is from an acceptable source.

10. The packet filtering system claimed in claim 6 wherein the test includes an analysis of a packet to determine whether to drop a packet from an outgoing transmission from the system to a remote destination.

11. An integrated circuit for communications packets, comprising:
    bus interface circuitry including a packet header-position determining circuit and a counter for counting bit-groups in a packet;
    a packet buffer coupled to said bus interface circuitry; and
    extraction logic coupled to said packet buffer, said header-position determining circuit, and said counter, the extraction logic having an offset input for an offset code, and the extraction logic operable in response to a mathematical relationship of a bit-group count from said counter, a header position from said header-position determining circuit, and an offset code from said offset input, for said extraction logic to produce an output representing at least one datum in the packet from said packet buffer.

12. The integrated circuit claimed in claim 11 further comprising a masking circuit operable to mask the output of said extraction logic.

13. The packet processor claimed in claim 1 wherein said processing circuitry is operable to stall when an instruction requests datum but the datum is yet-to-arrive, and to execute the instruction when the datum has arrived.

14. A method for packet data extraction comprising:
monitoring a bus for a packet and holding bit-groups from the packet in a packet buffer;
determining a packet header-position of the packet;
counting bit-groups in the packet to determine a bit-group count at a reference location in a packet buffer; and
extracting at least one datum in the packet by accessing a position in said packet buffer in response to a mathematical relationship of 1) a bit-group count from said counting step, 2) a header position determined from the packet, and 3) an offset code.

* * * * *